United States Patent
Tsugawa et al.

(10) Patent No.: US 10,439,516 B2
(45) Date of Patent: Oct. 8, 2019

(54) INVERTER WITH CHARGING CAPABILITY

(71) Applicant: NISSAN MOTOR CO., LTD., Yokohama-shi, Kanagawa (JP)

(72) Inventors: Dai Tsugawa, Kanagawa (JP); Shigeharu Yamagami, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/737,415

(22) PCT Filed: Jun. 23, 2015

(86) PCT No.: PCT/JP2015/067989
§ 371 (c)(1),
(2) Date: Dec. 18, 2017

(87) PCT Pub. No.: WO2016/207969
PCT Pub. Date: Dec. 29, 2016

(65) Prior Publication Data
US 2018/0159441 A1   Jun. 7, 2018

(51) Int. Cl.
*H02J 7/00* (2006.01)
*H02M 7/5387* (2007.01)
(Continued)

(52) U.S. Cl.
CPC ....... *H02M 7/53871* (2013.01); *H02J 7/0052* (2013.01); *H02M 1/08* (2013.01);
(Continued)

(58) Field of Classification Search
CPC .. H02M 7/53871; H02M 7/5387; H02M 7/48; H02J 7/0052
(Continued)

(56) References Cited

U.S. PATENT DOCUMENTS 3,938,020 A * 2/1976 Bourke ................. H02J 7/0054
320/139
4,065,711 A * 12/1977 Kawabata ............. G01S 13/422
307/66

(Continued)

FOREIGN PATENT DOCUMENTS

JP   2002-223559 A   8/2002
JP   2010-045961 A   2/2010
WO   WO 2014/206366 A1   12/2014

*Primary Examiner* — Robert Grant
*Assistant Examiner* — John T Trischler
(74) *Attorney, Agent, or Firm* — Foley & Lardner LLP

(57) ABSTRACT

An inverter includes an arm circuit, a first capacitor, a second capacitor, a first diode, and a second diode. In the arm circuit, upper arm switching elements to which a positive electrode of a battery is connected and lower arm switching elements to which a negative electrode of the battery is connected are connected. The first capacitor has one end connected to the positive electrode of the battery. The second capacitor is connected between another end of the first capacitor and the negative electrode of the battery. The first diode has a cathode electrode connected to the connection point between the upper arm and lower arm switching elements. The second diode has a cathode electrode connected to another end of the first capacitor. Power is supplied from an external power supply to an anode electrode of the first diode and an anode electrode of the second diode.

10 Claims, 14 Drawing Sheets

(51) Int. Cl.
*H02M 7/48* (2007.01)
*H02M 1/08* (2006.01)
*H02P 27/08* (2006.01)

(52) U.S. Cl.
CPC ............ *H02M 7/48* (2013.01); *H02M 7/5387* (2013.01); *H02J 2007/0059* (2013.01); *H02P 27/08* (2013.01); *Y02T 10/7005* (2013.01)

(58) Field of Classification Search
USPC ........................................................ 320/137
See application file for complete search history.

(56) References Cited

U.S. PATENT DOCUMENTS

| | | | | |
|---|---|---|---|---|
| 4,443,841 A * | 4/1984 | Mikami | ................ | H02M 7/487 363/132 |
| 4,823,247 A * | 4/1989 | Tamoto | .................. | H02J 9/062 323/224 |
| 5,126,585 A * | 6/1992 | Boys | ........................ | H02J 9/062 307/45 |
| 5,254,932 A * | 10/1993 | Bittar | ..................... | H02J 7/022 320/145 |
| 5,383,108 A * | 1/1995 | Okayama | .............. | H02M 7/487 363/137 |
| 5,402,043 A * | 3/1995 | Nilssen | ............. | H02M 7/53832 315/209 R |
| 5,459,655 A * | 10/1995 | Mori | ....................... | H01L 23/04 257/E23.14 |
| 5,731,970 A * | 3/1998 | Mori | ....................... | H01L 23/04 257/E23.14 |
| 5,801,936 A * | 9/1998 | Mori | ....................... | H01L 23/04 257/E23.136 |
| 5,929,519 A * | 7/1999 | Mori | ....................... | H01L 23/04 257/724 |
| 6,002,603 A * | 12/1999 | Carver | ................. | H02M 3/158 363/132 |
| 6,104,624 A * | 8/2000 | Iwamoto | ................ | H02M 7/48 307/82 |
| 6,737,847 B2 * | 5/2004 | Watanabe | ............... | H02J 7/345 307/109 |
| 6,842,354 B1 * | 1/2005 | Tallam | .................. | H02M 7/487 363/132 |
| 7,138,730 B2 * | 11/2006 | Lai | .......................... | H02J 9/062 307/82 |
| 7,336,004 B2 * | 2/2008 | Lai | .......................... | H02J 9/062 307/66 |
| 7,440,300 B2 * | 10/2008 | Konishi | .................... | H02J 3/38 323/222 |
| 7,486,034 B2 * | 2/2009 | Nakamura | .............. | B60L 7/06 307/10.1 |
| 7,639,515 B2 * | 12/2009 | Ponnaluri | ............. | H02M 7/487 363/131 |
| 7,646,182 B2 * | 1/2010 | Nakabayashi | ........ | H02M 3/158 323/272 |
| 7,649,335 B2 * | 1/2010 | Ishikawa | ............... | B60L 3/0007 320/104 |
| 7,656,689 B2 * | 2/2010 | Yoshimoto | ........ | H02M 7/53875 363/71 |
| 7,710,065 B2 * | 5/2010 | Sato | ........................ | H02J 1/102 307/43 |
| 7,800,346 B2 * | 9/2010 | Bolz | ..................... | H02J 7/0014 320/116 |
| 7,812,572 B2 * | 10/2010 | Bolz | ..................... | H02J 7/0018 320/116 |
| 7,855,901 B2 * | 12/2010 | Oyobe | ................... | B60L 11/123 318/803 |
| 7,869,226 B2 * | 1/2011 | Sirio | ................... | H02M 3/1588 363/132 |
| 7,872,887 B2 * | 1/2011 | Nishio | .................. | H02M 7/487 323/906 |
| 7,928,600 B2 * | 4/2011 | Hishikawa | .......... | G01R 33/3614 307/17 |
| 8,008,809 B2 * | 8/2011 | Nielsen | .................... | H02J 1/102 307/82 |
| 8,027,179 B2 * | 9/2011 | Hallak | ................ | H02M 7/4807 363/127 |
| 8,103,892 B2 * | 1/2012 | Krajcovic | ................ | H02J 1/14 307/43 |
| 8,125,807 B2 * | 2/2012 | Xuan | ...................... | H02J 3/385 323/906 |
| 8,391,038 B2 * | 3/2013 | Zacharias | ................ | H02J 3/38 363/132 |
| 8,456,132 B2 * | 6/2013 | Kinoshita | ........... | H01M 10/441 320/116 |
| 8,593,844 B2 * | 11/2013 | Nishio | .................... | H02M 7/48 363/132 |
| 8,611,120 B2 * | 12/2013 | Okuda | .................. | H02M 7/487 363/132 |
| 8,618,767 B2 * | 12/2013 | Ishii | ...................... | B60L 3/0069 320/104 |
| 8,860,379 B2 * | 10/2014 | Kajouke | ................ | H02M 5/293 320/166 |
| 8,884,464 B2 * | 11/2014 | Jayaraman | .............. | H02M 1/10 307/66 |
| 8,891,254 B2 * | 11/2014 | Kominami | .............. | H02M 1/32 363/17 |
| 8,923,027 B2 * | 12/2014 | Wu | ....................... | H02M 7/483 363/132 |
| 8,937,400 B2 * | 1/2015 | Obayashi | ................ | B60L 1/003 180/65.21 |
| 8,970,161 B1 * | 3/2015 | Cuadros | ................ | H02J 7/0068 320/101 |
| 8,981,721 B2 * | 3/2015 | Yamauchi | ............. | B60L 3/0046 320/116 |
| 8,988,915 B2 * | 3/2015 | Ku | .................... | H02M 7/53871 363/132 |
| 9,077,255 B2 * | 7/2015 | Fu | ...................... | H02M 3/33546 |
| 9,130,476 B2 * | 9/2015 | Takizawa | .............. | H02M 7/487 |
| 9,209,707 B2 * | 12/2015 | Park | ..................... | H02J 3/385 |
| 9,214,874 B2 * | 12/2015 | Kolhatkar | ............. | H02M 7/487 |
| 9,231,488 B2 * | 1/2016 | Zhu | ....................... | H02M 3/337 |
| 9,306,472 B2 * | 4/2016 | Shimada | ................ | H02M 7/48 |
| 9,306,474 B2 * | 4/2016 | Chen | ...................... | H02M 1/126 |
| 9,369,037 B2 * | 6/2016 | Lenz | ...................... | H02J 3/383 |
| 9,385,632 B2 * | 7/2016 | Hu | ........................ | H02M 7/487 |
| 9,419,541 B2 * | 8/2016 | Yoo | ...................... | H02M 7/483 |
| 9,467,057 B2 * | 10/2016 | Fu | ...................... | H02M 3/33546 |
| 9,509,229 B2 * | 11/2016 | Lee | .................... | H02M 7/53875 |
| 9,570,978 B2 * | 2/2017 | Matsumoto | ............. | H02M 1/08 |
| 9,595,886 B2 * | 3/2017 | Achihara | .................. | B60L 1/00 |
| 9,618,543 B2 * | 4/2017 | Hart | ..................... | H02M 7/5387 |
| 9,680,395 B2 * | 6/2017 | Torrico-Bascope | ......................... H02M 7/487 |
| 9,701,208 B2 * | 7/2017 | Berger | .................. | H02M 7/493 |
| 9,705,313 B2 * | 7/2017 | Yamada | .................. | H02H 9/02 |
| 9,800,077 B2 * | 10/2017 | Hatakeyama | ......... | H02J 7/0072 |
| 9,806,625 B2 * | 10/2017 | Takahara | ............. | H02M 1/4258 |
| 9,816,737 B2 * | 11/2017 | Kamiya | .................. | F25B 31/02 |
| 9,845,021 B2 * | 12/2017 | Yang | ...................... | B60L 3/00 |
| 9,862,287 B2 * | 1/2018 | Tang | ...................... | B60L 1/006 |
| 9,929,660 B2 * | 3/2018 | Takahara | ................ | H02M 3/28 |
| 9,931,951 B2 * | 4/2018 | Khaligh | ............... | B60L 11/1812 |
| 9,948,194 B2 * | 4/2018 | Higaki | .................. | H02J 1/00 |
| 9,985,524 B2 * | 5/2018 | Okada | ................... | H02M 3/158 |
| 9,998,018 B2 * | 6/2018 | Fu | ...................... | H02M 3/33546 |
| 10,166,877 B2 * | 1/2019 | Zeng | ................... | B60L 11/185 |
| 10,166,882 B2 * | 1/2019 | Yang | ....................... | H02J 3/32 |
| 2002/0048181 A1 * | 4/2002 | Kobayashi | ............. | H02M 1/12 363/71 |
| 2004/0004463 A1 * | 1/2004 | Young | .................. | H02J 7/0068 320/134 |
| 2004/0233685 A1 * | 11/2004 | Matsuo | ................. | H02M 3/285 363/65 |
| 2004/0246756 A1 * | 12/2004 | Bijlenga | ............... | H02M 7/487 363/132 |
| 2007/0029881 A1 * | 2/2007 | Lai | ......................... | H02J 9/062 307/82 |
| 2007/0076445 A1 * | 4/2007 | Boke | ................... | H02M 3/3376 363/17 |

(56) References Cited

U.S. PATENT DOCUMENTS

| | | | |
|---|---|---|---|
| 2007/0147098 A1* | 6/2007 | Mori | H02J 3/01 363/71 |
| 2007/0211501 A1* | 9/2007 | Zargari | H02M 1/44 363/39 |
| 2007/0291522 A1* | 12/2007 | Toba | H02H 7/1225 363/132 |
| 2008/0084184 A1* | 4/2008 | Ohnuki | H02J 7/1423 320/116 |
| 2008/0197706 A1* | 8/2008 | Nielsen | H02J 1/102 307/66 |
| 2008/0197810 A1* | 8/2008 | Ishikawa | B60L 3/0007 320/135 |
| 2008/0211456 A1* | 9/2008 | Bolz | H02J 7/0018 320/116 |
| 2008/0304301 A1* | 12/2008 | Nishio | H02M 7/487 363/132 |
| 2009/0067200 A1* | 3/2009 | Bolz | H02J 7/0014 363/17 |
| 2009/0251938 A1* | 10/2009 | Hallak | H02M 7/4807 363/132 |
| 2009/0290385 A1* | 11/2009 | Jungreis | H02M 1/4241 363/17 |
| 2009/0322148 A1* | 12/2009 | Kitanaka | B60L 9/22 307/9.1 |
| 2010/0213896 A1* | 8/2010 | Ishii | B60L 3/0069 320/109 |
| 2011/0044077 A1* | 2/2011 | Nielsen | H02J 9/062 363/37 |
| 2011/0116293 A1* | 5/2011 | Tabata | H02M 7/487 363/132 |
| 2011/0134672 A1* | 6/2011 | Sato | H02M 1/10 363/126 |
| 2011/0211381 A1* | 9/2011 | Iwata | H02M 7/49 363/132 |
| 2011/0234162 A1* | 9/2011 | Kinoshita | H01M 10/441 320/116 |
| 2011/0242866 A1* | 10/2011 | Takizawa | H02M 7/487 363/131 |
| 2011/0260531 A1* | 10/2011 | Obayashi | B60L 1/003 307/10.1 |
| 2011/0298424 A1* | 12/2011 | Yamauchi | B60L 3/0046 320/118 |
| 2012/0044728 A1* | 2/2012 | Yatsu | H02M 7/219 363/126 |
| 2012/0075899 A1* | 3/2012 | Nishio | H02M 7/48 363/131 |
| 2012/0092915 A1* | 4/2012 | Okuda | H02M 7/487 363/132 |
| 2012/0155124 A1* | 6/2012 | Cheng | H02M 3/337 363/24 |
| 2013/0016543 A1* | 1/2013 | Ku | H02M 7/53871 363/71 |
| 2013/0063067 A1* | 3/2013 | Tanaka | H01L 25/07 318/494 |
| 2013/0293192 A1* | 11/2013 | Abe | B60L 11/182 320/108 |
| 2014/0036555 A1* | 2/2014 | Kolhatkar | H02M 7/487 363/56.01 |
| 2014/0049215 A1* | 2/2014 | Fassnacht | B60L 11/1814 320/109 |
| 2014/0097687 A1* | 4/2014 | Park | H02J 3/385 307/43 |
| 2014/0103860 A1* | 4/2014 | Kominami | H02M 1/32 320/103 |
| 2014/0119060 A1* | 5/2014 | Zhu | H02M 1/10 363/17 |
| 2014/0159481 A1* | 6/2014 | Berger | H02M 7/493 307/10.1 |
| 2014/0198536 A1* | 7/2014 | Fu | H02M 3/33546 363/17 |
| 2014/0217973 A1* | 8/2014 | Lee | B60L 11/1812 320/109 |
| 2014/0217974 A1* | 8/2014 | Kim | B60L 11/1812 320/109 |
| 2014/0285179 A1* | 9/2014 | Hart | H02M 7/5387 324/86 |
| 2014/0321181 A1* | 10/2014 | Chen | H02M 7/487 363/132 |
| 2015/0002066 A1* | 1/2015 | Oda | H02M 5/4585 318/500 |
| 2015/0016155 A1* | 1/2015 | Lee | H02M 7/53875 363/44 |
| 2015/0029772 A1* | 1/2015 | Shimada | H02M 7/48 363/132 |
| 2015/0102672 A1* | 4/2015 | Matsumoto | H02M 1/08 307/31 |
| 2015/0145481 A1* | 5/2015 | Yamauchi | B60L 3/0046 320/117 |
| 2015/0239358 A1* | 8/2015 | Ripoll | H02M 1/10 320/109 |
| 2015/0263635 A1* | 9/2015 | Fu | H02M 3/33546 363/17 |
| 2015/0295491 A1* | 10/2015 | Lenz | H02J 3/383 323/234 |
| 2016/0028224 A1* | 1/2016 | Yamada | H02M 7/487 363/56.11 |
| 2016/0118910 A1* | 4/2016 | Torrico-Bascope | H02M 7/487 363/131 |
| 2016/0137075 A1* | 5/2016 | Zeng | B60L 3/0069 320/134 |
| 2016/0159228 A1* | 6/2016 | Tang | H02J 7/02 307/10.1 |
| 2016/0159235 A1* | 6/2016 | Yang | B60L 3/00 320/109 |
| 2016/0172976 A1* | 6/2016 | Mu | H02M 7/487 323/271 |
| 2016/0204707 A1* | 7/2016 | Takahara | H02M 1/4258 363/16 |
| 2016/0211749 A1* | 7/2016 | Okada | H02M 7/487 |
| 2016/0241073 A1* | 8/2016 | Hatakeyama | H02M 1/12 |
| 2016/0245571 A1* | 8/2016 | Shinomoto | H02M 1/36 |
| 2016/0265822 A1* | 9/2016 | Kamiya | H02M 7/062 |
| 2016/0329811 A1* | 11/2016 | Du | H02M 3/1584 |
| 2017/0033701 A1* | 2/2017 | Fu | H02M 3/33546 |
| 2017/0237354 A1* | 8/2017 | Takahara | H02M 3/33546 363/17 |
| 2017/0237359 A1* | 8/2017 | Ohnishi | H02M 7/537 363/131 |
| 2017/0244334 A1* | 8/2017 | Ohnishi | H02M 5/458 |
| 2017/0305298 A1* | 10/2017 | Takeshima | B60L 15/007 |
| 2017/0358996 A1* | 12/2017 | Higaki | H02J 1/00 |

* cited by examiner

INVERTER WITH CHARGING CAPABILITY

TECHNICAL FIELD

The present invention relates to an inverter with charging capability which can be also used as a charging unit.

BACKGROUND ART

An electric vehicle, such as the conventional electric car or hybrid car, is provided with an inverter, which controls driving of a motor. The examples of this inverter include the one that performs (is used in common for) the drive control of a motor and the charge control of a battery.

This inverter with charging capability boosts, in receipt of power from an external power supply, the voltage of the external power supply by a switching operation of the inverter and charges power to the battery of an electric vehicle. Conventionally, the inverter with charging capability and the external power supply are connected to each other via a reactance including a coil (Patent Literature 1).

CITATION LIST

Patent Literature

Patent Literature 1: Japanese Laid-open Patent Publication No. 2002-223559

SUMMARY OF INVENTION

In order to electrically stabilize a feeding point of an inverter with charging capability, it is necessary to connect the inverter with charging capability with an external power supply via a reactance. The reactance causes an increase in size of the conventional inverter with charging capability.

The present invention has been made in view of this problem, and provides an inverter with charging capability which can dispense with a large reactance to achieve reduction in size.

An inverter with charging capability according to an aspect of the present invention includes an arm circuit, a first capacitor, a second capacitor, a first diode, and a second diode. The arm circuit includes upper arm and lower arm switching elements connected to a battery. One end of the first capacitor is connected to the positive electrode of the battery. The second capacitor is connected between the other end of the first capacitor and the negative electrode of the battery. The first diode has a cathode electrode connected to a connection point between the upper arm and lower arm switching elements. The cathode electrode of the second diode is connected to the other end of the first capacitor. Then, in the inverter with charging capability according to an aspect of the present invention, power is supplied from an external power supply to the anode electrode of the first diode and the anode electrode of the second diode.

BRIEF DESCRIPTION OF DRAWINGS

FIG. 12(a) illustrates an example of the time chart for a long period time of the switching control performed by a switching controller 56 of the inverter 6 with charging capability, while FIG. 12(b) illustrates an example for a short period time.

DESCRIPTION OF EMBODIMENTS

Embodiments will be described with reference to the drawings. In the description of the drawings, the same part is given the same reference sign to omit the description thereof.

(First Embodiment)

Figure 1:
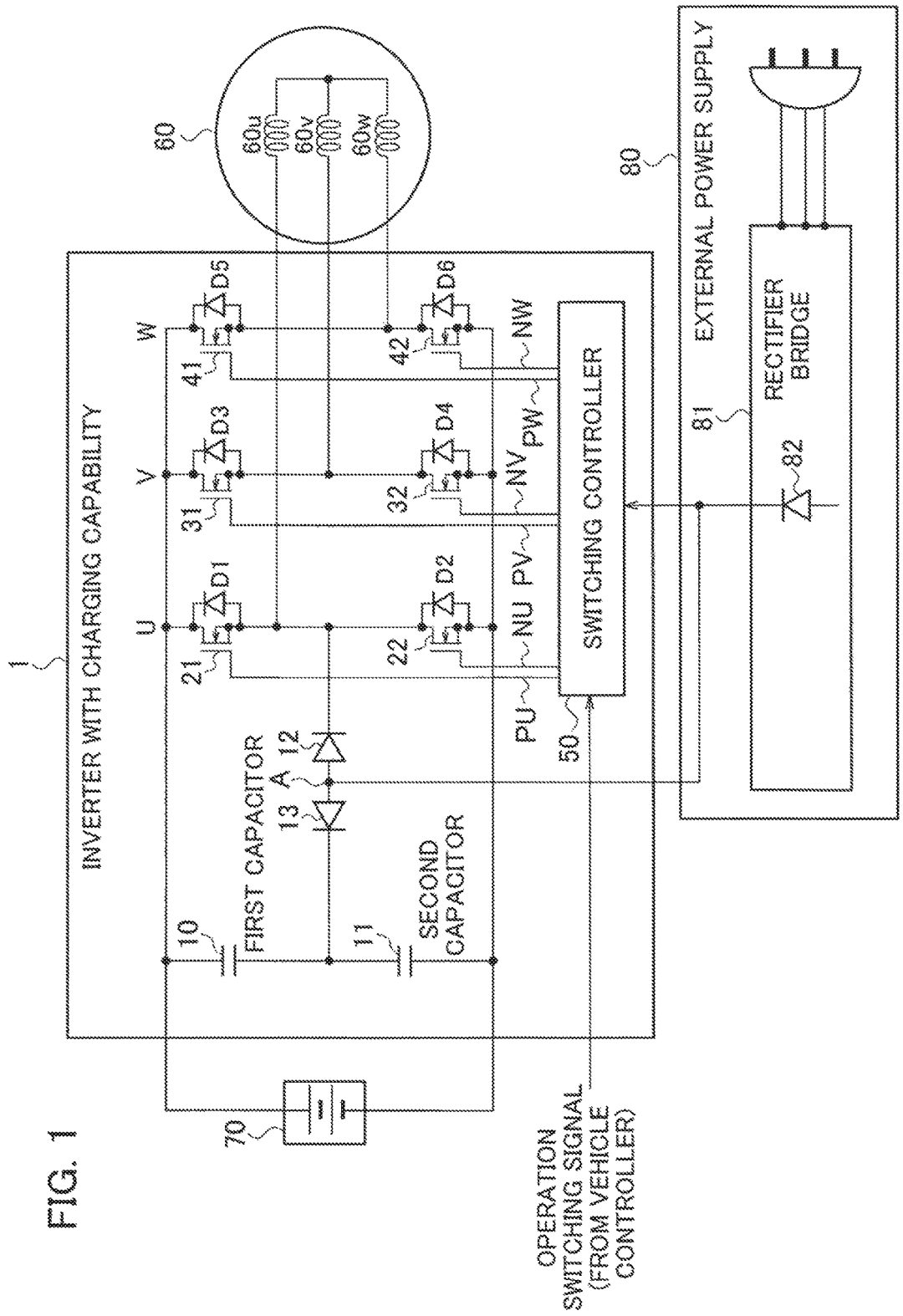
FIG. 1 illustrates a configuration example of an inverter 1 with charging capability of a first embodiment.

FIG. 1 illustrates a configuration example of an inverter 1 with charging capability of a first embodiment. The inverter 1 with charging capability controls, with the motor current supplied, for example, to a three-phase permanent-magnet type synchronous motor (hereinafter, motor) 60, a driving torque generated by the motor 60 and also controls to charge the power of an external power supply 80 to a battery 70.

The inverter 1 with charging capability includes a first capacitor 10, a second capacitor 11, a first diode 12, a second diode 13, upper arm switching elements 21, 31, and 41, and lower arm switching elements 22, 32, and 42. This example includes a plurality of arm circuits (U-phase, V-phase, and W-phase) in which an upper arm and a lower arm are connected.

The positive electrode of the battery 70 is connected to the upper arm switching elements 21, 31, and 41, respectively. The negative electrode of the battery 70 is connected to the lower arm switching elements 22, 32, and 42, respectively.

The upper arm switching element 21 and the lower arm switching element 22 are connected to each other to constitute the U-phase arm circuit. The upper arm switching element 31 and the lower arm switching element 32 are connected to each other to constitute the V-phase arm circuit. The upper arm switching element 41 and the lower arm switching element 42 are connected to each other to constitute the W-phase arm circuit.

One end of the first capacitor 10 is connected to the positive electrode of the battery 70. The second capacitor 11 connects between the other end of the first capacitor 10 and the negative electrode of the battery 70.

The cathode electrode of the first diode 12 is connected to the connection point between the U-phase upper arm switching element 21 and the U-phase lower arm switching element 22. The cathode electrode of the second diode 13 is connected to the other end of the first capacitor 10. A rectifier bridge 81 of the external power supply 80 is connected to a feeding point A at which the anode electrode of the first diode 12 and the anode electrode of the second diode 13 are connected to each other.

The rectifier bridge 81 is an ordinary one which rectifies the alternating current (AC) of the external power supply 80. The external power supply 80 may be a three-phase AC power supply or may be a single-phase AC power supply.

Each of the upper arm switching elements 21, 31, and 41 and the lower arm switching elements 22, 32, and 42 includes an NMOSFET, for example. The respective switching elements 21, 31, 41, 22, 32, and 42 may include an IGBT (Insulated Gate Bipolar Transistor), a GTO (Gate Turn Off thyristor), or the like. The respective switching elements 21, 22, 31, 32, 41, and 42 have respective diodes D1, D2, D3, D4, D5, and D6 connected in antiparallel thereto.

A signal PU output by a switching controller 50 is input to the gate electrode of the U-phase upper arm switching element 21. A signal NU output by the switching controller 50 is input to the gate electrode of the same U-phase lower arm switching element 22.

A signal PV output by the switching controller 50 is input to the gate electrode of the V-phase upper arm switching element 31. A signal NV output by the switching controller 50 is input to the gate electrode of the same V-phase lower arm switching element 32.

A signal PW output by the switching controller 50 is input to the gate electrode of the W-phase upper arm switching element 41. A signal NW output by the switching controller 50 is input to the gate electrode of the same W-phase lower arm switching element 42.

The connection point between the switching element 21 and switching element 22 constituting the U-phase arm circuit is connected to a U-phase motor coil 60$u$ of the motor 60. The connection point between the switching element 31 and switching element 32 constituting the V-phase arm circuit is connected to a V-phase motor coil 60$v$ of the motor 60. The connection point between the switching element 41 and switching element 42 constituting the W-phase arm circuit is connected to a W-phase motor coil 60$w$ of the motor 60.

The switching controller 50 switches a control logic based on an operation switching signal from a non-illustrated vehicle controller which controls, for example, the operation of the electric vehicle. The control logic of the switching controller 50 includes two control logics: a load control logic for driving the motor 60 with a direct current (DC) power stored in the battery 70; and a charge control logic for charging the power supplied from the external power supply 80 to the battery 70.

Figure 2:
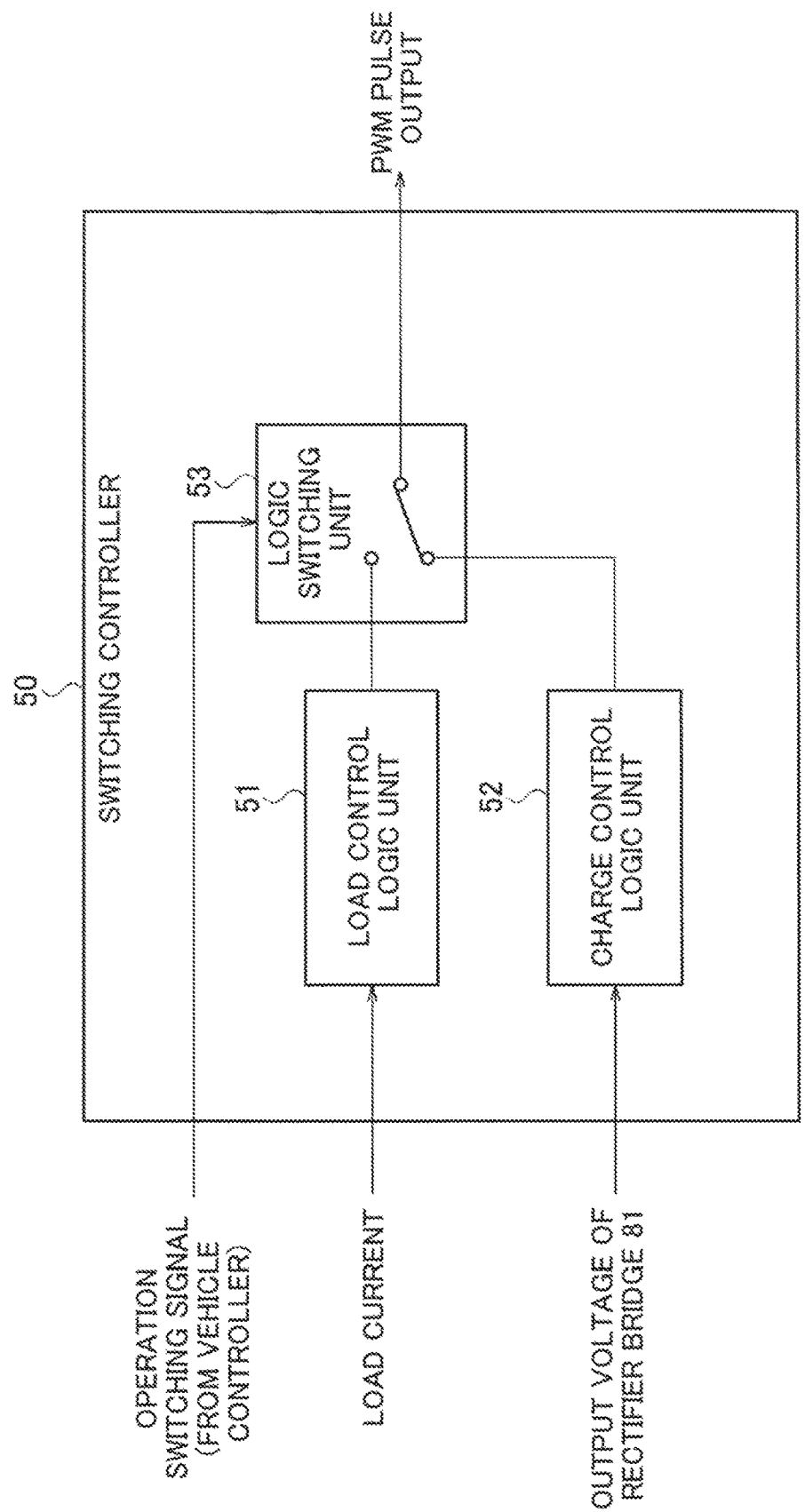
FIG. 2 illustrates a functional configuration example of a switching controller 50 of the inverter 1 with charging capability.

The operation of the switching controller 50 will be explained with reference to FIG. 2. FIG. 2 illustrates a logic configuration when the switching controller 50 is realized with a microcomputer, for example. The switching controller 50 constituted from an arithmetic processing unit of the microcomputer includes a load control logic unit 51, a charge control logic unit 52, and a logic switching unit 53.

The load control logic unit 51 monitors the load current flowing in each phase of the motor 60, and generates a PWM (Pulse Width Modulation) signal for controlling the drive voltage of each phase so that a load current corresponding to a current command from a non-illustrated vehicle controller flows. The PWM signal refers to each of the above-described signals PU, NU, signals PV, NV, and signals PW, NW.

Moreover, the charge control logic unit 52 generates a PWM signal for charging the power from the external power supply to the battery 70 in accordance with the output voltage of the rectifier bridge 81 which rectifies the alternating current of the external power supply 80. The charging is performed by boosting the output voltage of the rectifier bridge 81 using each of the motor coils 60$u$, 60$v$, and 60$w$ of the motor 60.

The logic switching unit 53 selects, when the operation switching signal is in a state of driving the motor 60, a PWM signal generated by the load control logic unit 51. Note that the PWM signal generated by the load control logic unit 51 is the same as the PWM signal when the conventional inverter drives a motor.

Figure 3:
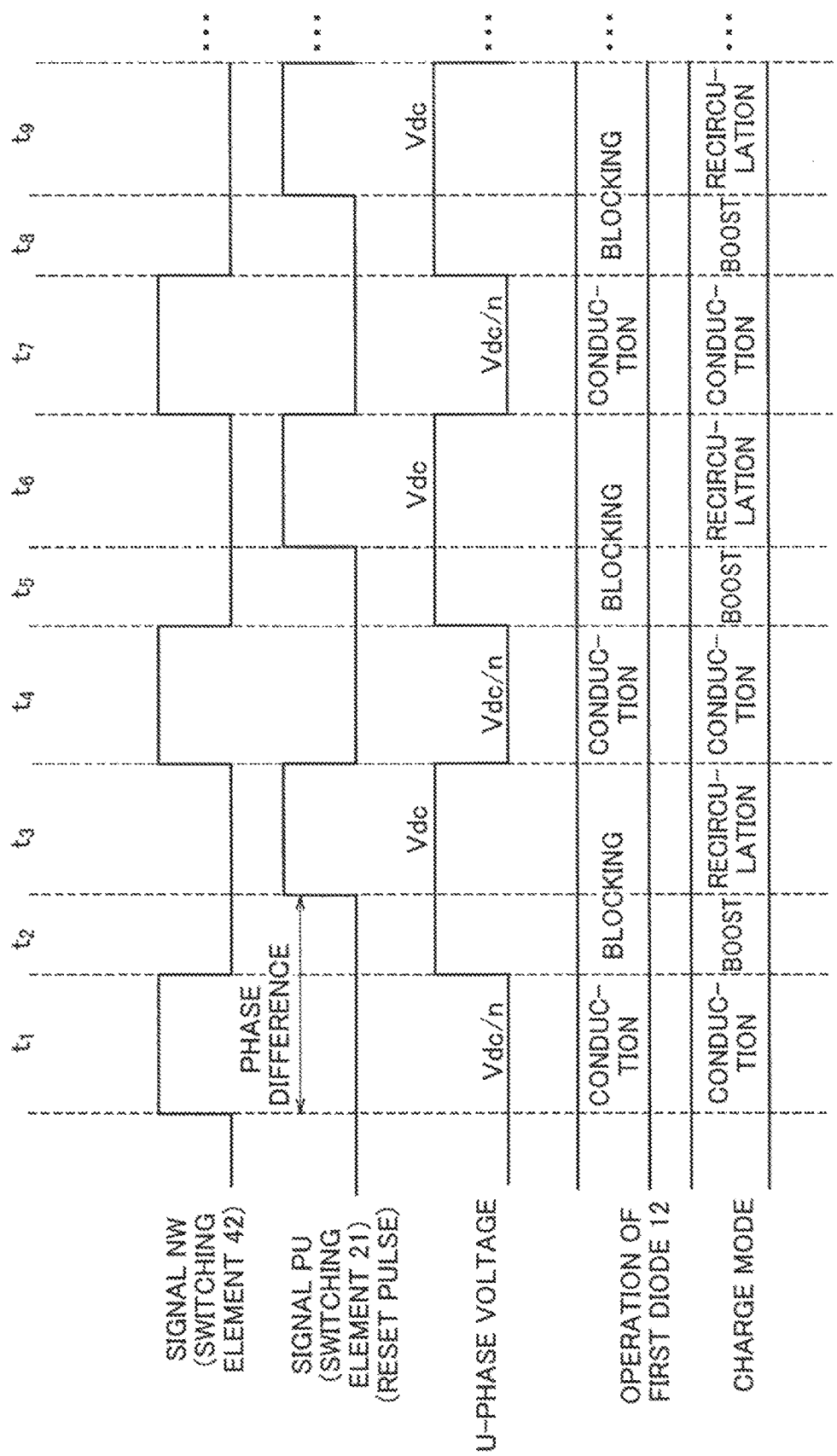
FIG. 3 illustrates an example of the time chart of the switching control performed by the switching controller 50.

The PWM signal output by the charge control logic unit 52 will be explained with reference to FIG. 3. From the top of FIG. 3, there are illustrated the signal NW which is the PWM signal output by the charge control logic unit 52 (switching controller 50), the signal PU which is also a PWM signal, a U-phase voltage to which the cathode electrode of the first diode 12 is connected, the operation state of the first diode 12, and the charge mode of the charge control logic. The horizontal direction of FIG. 3 represents time. An interval during which the amplitude in the vertical direction is high (High: "1") represents the interval for turning on each switching element, while an interval during which the amplitude in the vertical direction is low (Low: "0") represents the interval for turning off each switching element. Note that Vdc/n and Vdc in the view represent voltage values. Vdc is the voltage of the positive electrode of the battery 70.

In an interval $t_1$ during which the signal NW is "1", only the W-phase lower arm switching element 42 (FIG. 1) is ON and all the other switching elements are OFF. The U-phase voltage in this interval $t_1$ is Vdc/n. Vdc/n is the voltage obtained by dividing Vdc with the first capacitor 10 and second capacitor 11 in this example. If the capacitances of the first capacitor 10 and the second capacitor 11 are the same, the voltage is Vdc/2.

The reason why the U-phase voltage becomes Vdc/2 in the interval $t_1$ will be explained. The output of the rectifier bridge 81 is connected to the anode electrodes of the first diode 12 and second diode 13, i.e., the feeding point A, via a rectifier diode 82.

In this configuration, when the output voltage of the rectifier bridge 81 is higher than Vdc/2, a current flows through the rectifier diode 82, the second diode 13, and the second capacitor 11. As the result, the voltage of the anode electrode of the second diode 13 is clamped to Vdc/2 by the voltage clamp action of the second diode 13.

Moreover, in this case (the case where the output voltage of the rectifier bridge 81 is higher than Vdc/2 in the interval $t_1$), a current flows through the rectifier diode 82, the first diode 12, the motor coil 60$u$, the motor coil 60$w$, and the switching element 42. The operation state of the first diode 12 in this case is a conduction state in which a current flows to the motor 60 from the external power supply 80. Therefore, the charge mode of the charge control logic in the interval $t_1$ is referred to as a "conduction mode." The magnetic energy by the current in this "conduction mode" is stored in the motor coils 60$u$ and 60$w$.

Moreover, when the output voltage of the rectifier bridge 81 is lower than Vdc/2, the rectifier diode 82 and the second diode 13 are reversely biased. Therefore, the rectifier diode 82 acts as a backflow prevention diode. As the result, the output of the rectfier bridge 81 and the second capacitor 11 are isolated from each other and the voltage of the anode electrode of the second diode 13 is maintained at Vdc/2 clamped by the second diode 13.

That is, according to the inverter 1 with charging capability of the present embodiment, the voltage of the anode electrode of the second diode 13 can be stabilized at Vdc/2 even if the output voltage of the rectifier bridge 81 varies. The voltage of the anode electrode of the second diode 13 is actually Vdc/2+VF (the forward voltage of the second diode 13). Accordingly, the U-phase voltage becomes Vdc/2 which is the resultant voltage reduced by the forward voltage VF of the first diode 12.

As described above, the inverter 1 with charging capability of the present embodiment can stabilize the potential at the feeding point A to which the power of the external power supply 80 is supplied, without using a large reactance.

In an interval $t_2$, if the signal NW varies from "1" to "0", the W-phase lower arm switching element 42 is turned off. If the switching element 42 becomes OFF, the current having flown through the rectifier diode 82, the first diode 12, the motor coil 60$u$, the motor coil 60$w$, and the switching element 42 in the interval $t_1$ is shut off by the switching element 42.

Then, the magnetic energy stored in the motor coils 60$u$ and 60$w$ in the interval $t_1$ can be recovered as a self-induction electromotive force generated by self-inductance effect. The magnetic energy stored in the motor coils 60$u$ and 60$w$ generates a boosted voltage waveform (self-induction electromotive force) corresponding to this energy in the U-phase voltage at the moment when the interval $t_2$ starts.

The boosted voltage waveform (self-induction electromotive force) generated in the U-phase charges the battery 70 via the diode D1. The first diode 12 acts as a backflow prevention diode with respect to this boosted voltage waveform. Accordingly, the charging current flowing by this boosted voltage waveform will flow only into the battery 70 via the diode D1.

The operation state of the first diode 12 in the interval $t_2$ is a blocking state because the first diode 12 acts as a backflow prevention diode with respect to this boosted voltage waveform. Note that the charge mode of the charge control logic in the interval $t_2$ is referred to as a "boost mode" because a boosted voltage waveform is generated. Note that the time width of the interval $t_2$ may be shorter than the time width of the interval $t_1$.

Next, in an interval $t_3$ during which the signal NW becomes "0" and the signal PU becomes "1", the U-phase upper arm switching element 21 is turned on. If the U-phase upper arm switching element 21 is turned on, the boosted voltage waveform charges the battery 70 via the switching element 21. Moreover, once the switching element 21 is turned on, the U-phase voltage becomes Vdc which is the voltage of the positive electrode of the battery 70.

Turning on the U-phase upper arm switching element 21 resets the U-phase voltage to Vdc. That is, in the interval $t_3$, turning on the switching element 21 prevents the U-phase voltage from becoming unstable due to the boosted voltage waveform. Therefore, the signal PU in the interval $t_3$ may be referred to as a reset pulse.

As described above, according to the inverter 1 with charging capability, the boosted-voltage can be controlled by controlling a phase difference from turning on the W-phase lower arm switching element 42 and to turning on the U-phase upper arm switching element 21. Here, the reason why the phase difference is set to the one from turning on the W-phase lower arm to turning on the U-phase upper arm is that the time width of the interval $t_2$ may be short as described above. The boosted voltage waveform (self-induction electromotive force) can be increased by increasing this phase difference.

The operation state of the first diode 12 in the interval $t_3$ is the blocking state in which the first diode 12 acts as a backflow prevention diode because the switching element 21 is turned on to reset the U-phase voltage to Vdc. Note that the charge mode of the charge control logic in the interval $t_3$ is referred to as a "recirculation mode", because the boosted voltage waveform (self-induction electromotive force) generated in the interval $t_2$ is recirculated to the battery 70.

The charge control logic unit 52 generates a PWM signal for repeating the above-described intervals $t_1$ to $t_3$. An interval $t_4$ is the same as the interval $t_1$. An interval $t_5$ is the same as the interval $t_2$. An interval $t_6$ is the same as the interval $t_3$. The charge control logic unit 52 repeats the intervals $t_1$ to $t_3$ also in an interval $t_7$ and thereafter.

As described above, according to the inverter 1 with charging capability of the present embodiment, the potential at the feeding point A can be stabilized without using a large reactance. Therefore, the inverter 1 with charging capability can be reduced in size.

Note that, in FIG. 1 the W-phase lower arm switching element 42 and the U-phase upper arm switching element 21 are turned on/off at a predetermined cycle, but not limited to this example. The V-phase lower arm switching element 32 and the U-phase upper arm switching element 21 may be turned on/off.

Moreover, the cathode electrode of the first diode 12 may be connected to the connection point between the V-phase upper arm switching element 31 and the V-phase lower arm switching element 32. In this case, the V-phase upper arm switching element 31 and, for example, the U-phase lower arm switching element 22 are turned on/off.

Moreover, the cathode electrode of the first diode 12 may be connected to the connection point between the W-phase upper arm switching element 41 and the W-phase lower arm switching element 42. In this case, the W-phase upper arm switching element 41 and, for example, the V-phase lower arm switching element 32 are turned on/off. The upper arm and lower arm to be turned on/off only need to be different from each other in this manner.

In short, the inverter 1 with charging capability can charge the battery 70 by controlling a phase difference for turning on a lower arm switching element of a phase, to which the first diode 12 is not connected, and turning on an upper arm switching element of a phase, to which the first diode 12 is connected. Moreover, because the potential at the feeding point A becomes stable even without using a large reactance, the inverter 1 with charging capability can dispense with a large reactance to reduce the size of the inverter 1 with charging capability. Moreover, because the potential at the feeding point A becomes stable, the inverter 1 with charging capability does not have an adversely effect on the reliability or life of the battery 70.

(Second Embodiment)

Figure 4:
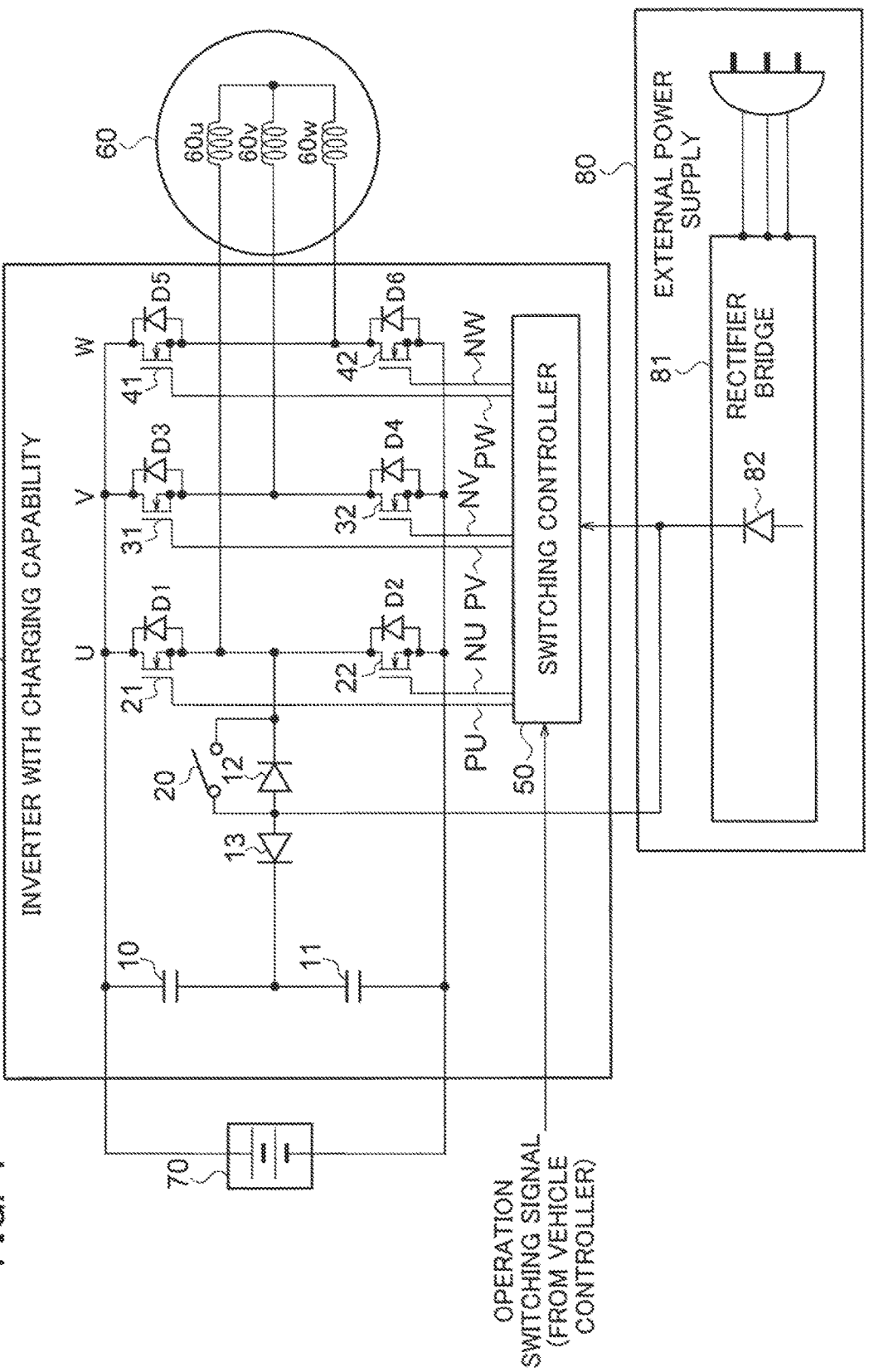
FIG. 4 illustrates a configuration example of an inverter 2 with charging capability of a second embodiment.

FIG. 4 illustrates a configuration example of an inverter 2 with charging capability of a second embodiment. The inverter 2 with charging capability of the present embodiment differs from the inverter 1 with charging capability (FIG. 1) in that it includes a first switching element 20 connected in parallel to the first diode 12.

Figure 5:
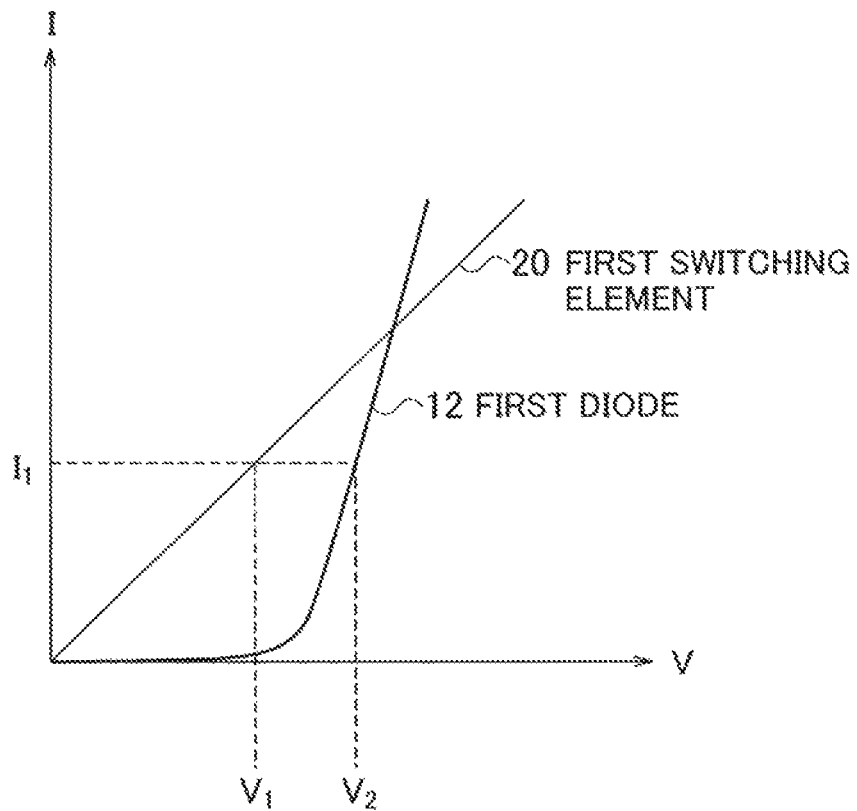
FIG. 5 illustrates the voltage-current characteristics of a first diode 12 and a first switching element 20.

The operational effect of the first switching element 20 will be explained with reference to FIG. 5. The horizontal axis of FIG. 5 represents voltage V, while the vertical axis represents current I. A thick solid line indicates the V-I characteristic of the first diode 12. A narrow solid line indicates the V-I characteristic of the first switching element 20.

The voltage needed to feed a current $I_1$ through the first diode 12 is $V_2$. The voltage needed to feed the same current $I_1$ through the first switching element 20 is $V_1$. Because the first diode 12 has the forward voltage VF on the order of 0.7 V, the relationship of $V_2 > V_1$ is always satisfied.

The power ($I_1 \times (V_2 - V_1)$) by this voltage difference results in a loss. In order to eliminate this loss, the first switching element 20 may be turned on in the interval $t_1$ (conduction mode) in which the first diode 12 does not act as the backflow prevention diode.

The first switching element 20 is turned on when the charge mode of the charge control logic is the "conduction mode." By turning on the first switching element 20, the voltage drop corresponding to the forward voltage VF of the first diode 12 can be eliminated from the path of the charging current. The inverter 2 with charging capability can improve the charging efficiency by the amount of the eliminated voltage drop.

Figure 6:
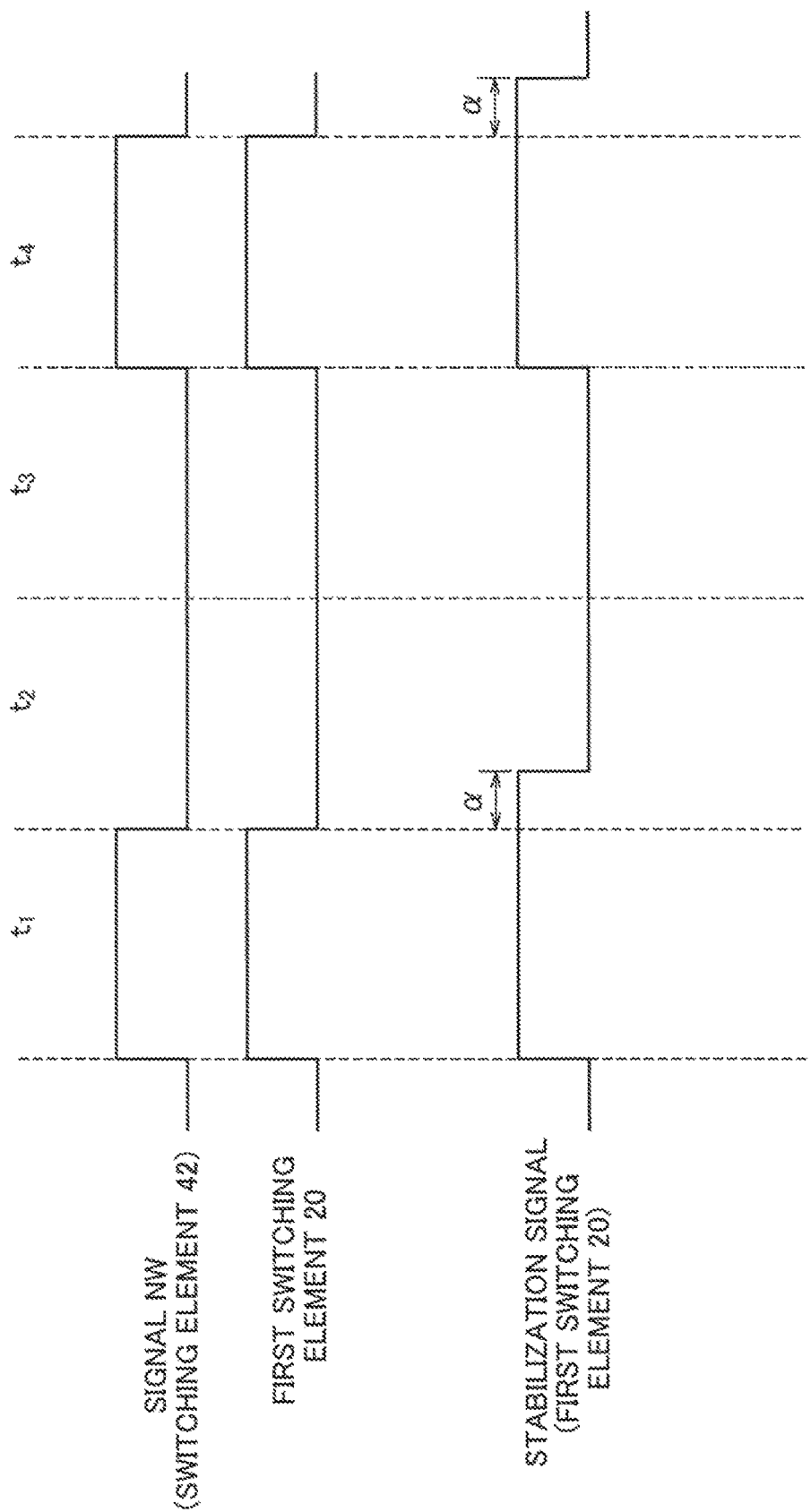
FIG. 6 illustrates the timings for turning on the first diode 12 and the first switching element 20.

FIG. 6 illustrates the timings for turning on the W-phase lower arm switching element 42 and the first switching element 20. The horizontal direction of FIG. 6 represents time, while the vertical direction represents the amplitude of a signal. The W-phase lower arm switching element 42 and the first switching element 20 are turned on by an amplitude "1."

In order to simultaneously turn on the W-phase lower arm switching element 42 and first switching element 20, the signal input to the gate electrode of the first switching element 20 is set to the same as the signal NW. When the amplitude of the signal NW becomes "0" (interval $t_2$), a boosted voltage waveform (self-induction electromotive force) is generated in the U-phase voltage to charge the battery 70.

Note that, by making the ON time of the first switching element 20 longer than the ON time of the W-phase lower arm switching element 42, it is possible to stabilize the generation of the self-induction electromotive force. The larger the amount of variation of the current at the moment of turning off the switching element 42, the larger the self-induction electromotive force becomes.

If the signal NW and the signal for controlling the on/off of the first switching element 20 are set to be the same signal, the amount of variation of the current may decrease due to a subtle delay of the signals. For example, if the first switching element 20 is turned off earlier, the current flowing through the W-phase lower arm switching element 42 will decrease by the amount of the forward voltage VF of the first diode 12. As the result, the amount of variation of the current at the moment of turning off the switching element 42 also decreases, so the self-induction electromotive force also decreases.

In order to prevent a reduction of the self-induction electromotive force, the first switching element 20 only needs to be surely on when the switching element 42 is turned off. The signal for stabilizing the generation of the self-induction electromotive force is illustrated as a stabilization signal, in FIG. 6. The stabilization signal is obtained by making the ON time of the first switching element 20 longer by a time period α than the ON time of the W-phase lower arm switching element 42.

By delaying the timing for turning off the first switching element 20 from the timing for turning off the lower arm switching element 42 in this manner, it is possible to obtain a stable boosted voltage waveform (self-induction electromotive force). Note that, when the U-phase lower arm switching element 22 is turned on/off and also when the V-phase lower arm switching element 32 is turned on/off, the same effect can be obtained if the ON time of the first switching element 20 is set to be longer than the ON times of these switching elements.

Note that various types of devices can be used for the first switching element 20. For example, an IGBT or a MOSFET can be used. Moreover, a relay having a contact point may be used. If the first switching element 20 is constituted from an NMOSFET, the first diode 12 can be eliminated. This point will be explained in the next embodiment.

(Third Embodiment)

Figure 7:
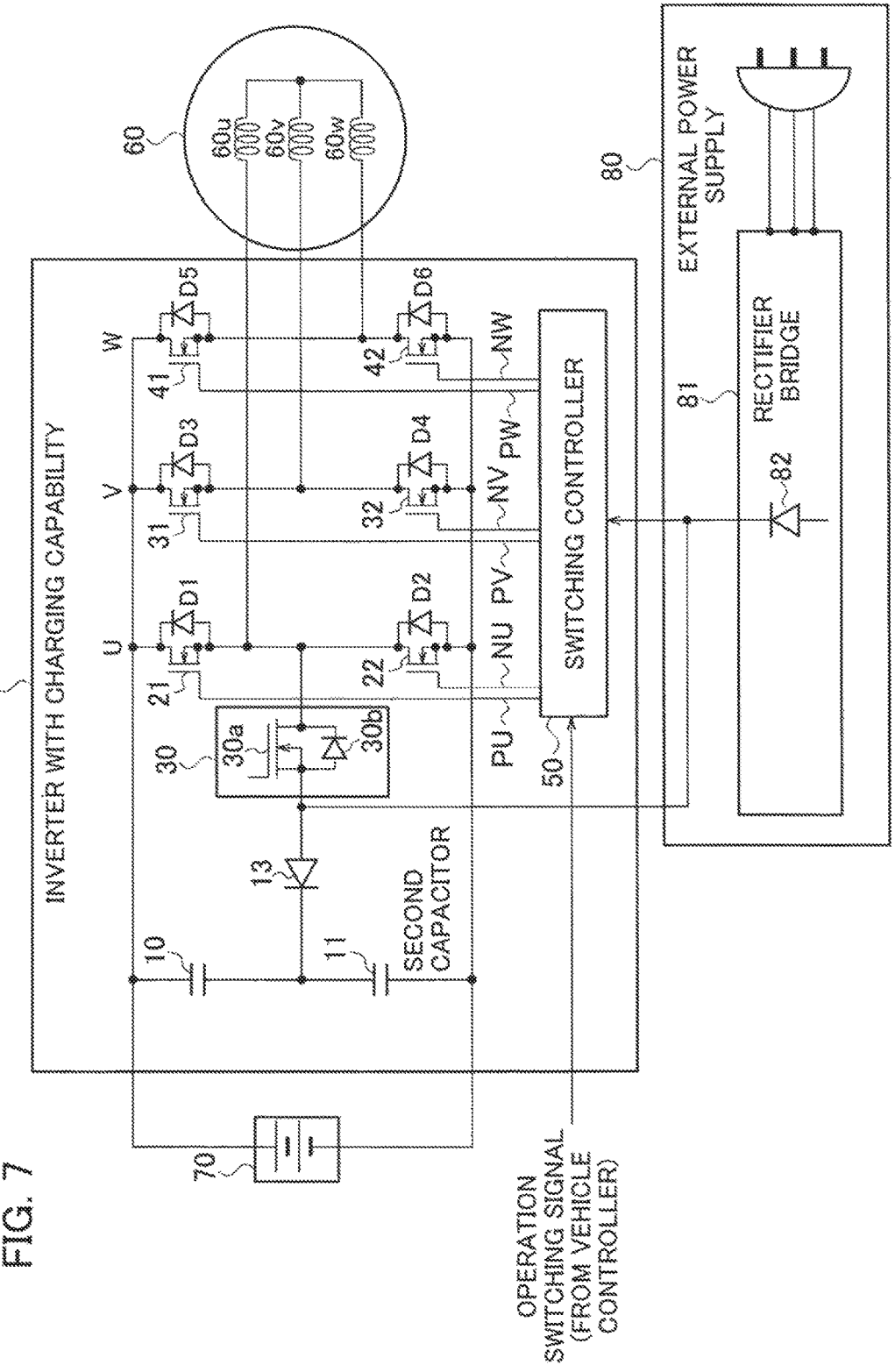
FIG. 7 illustrates a configuration example of an inverter 3 with charging capability of a third embodiment.

FIG. 7 illustrates a configuration example of an inverter 3 with charging capability of a third embodiment. The inverter 3 with charging capability of the present embodiment differs from the inverter 2 with charging capability (FIG. 4) in that the first diode 12 and first switching element 20 are configured as one device 30.

The device 30 is an NMOSFET. The device 30 includes an NMOSFET 30a and a first parasitic diode 30b. The first parasitic diode 30b is a diode which is inevitably included due to the semiconductor structure of an NMOSFET. The first parasitic diode 30b acts similarly to the first diode 12.

The anode electrode of the first parasitic diode 30b is a semiconductor substrate (p-type) which is biased to the same potential as the source electrode of the NMOSFET 30a. Moreover, the cathode electrode thereof is the drain electrode of the n-type semiconductor.

The inverter 3 with charging capability exhibits the effects of achieving a reduction in size and a reduction in cost of the inverter 2 with charging capability because it can eliminate the first diode 12 (FIG. 4) which is a discrete component. Note that the inverter 3 with charging capability exhibits the same operational effect as the inverter 2 with charging capability.

That is, turning on the NMOSFET 30a as with the first switching element 20 explained in the inverter 2 with charging capability allows the built-in voltage of the first parasitic diode 30b to be eliminated from the path of the charging current. The built-in voltage is a potential difference generated by the electric field inside a depletion layer region of a p-n junction, and is the voltage equivalent to the above-described forward voltage VF.

(Fourth Embodiment)

Figure 8:
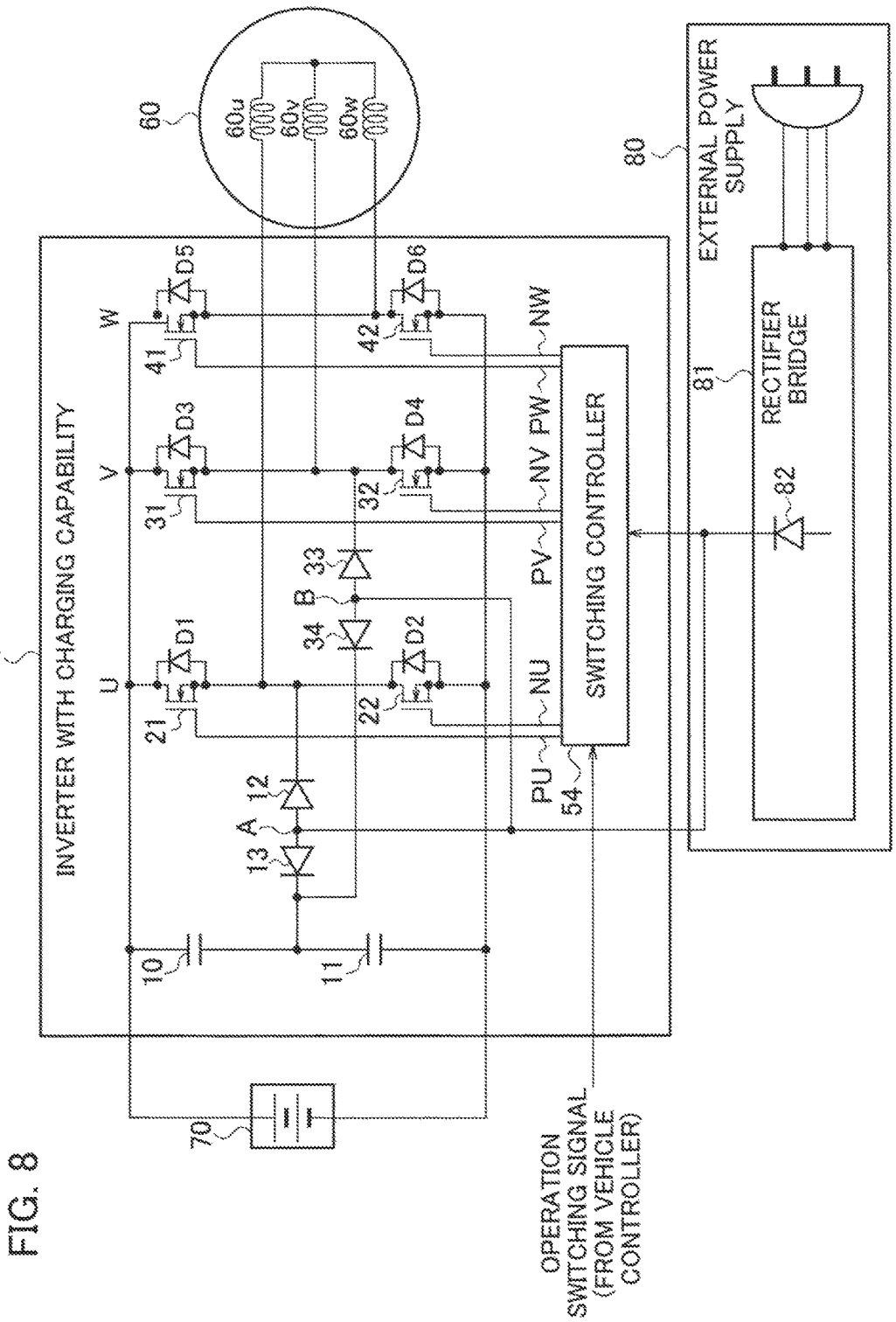
FIG. 8 illustrates a configuration example of an inverter 4 with charging capability of a fourth embodiment.

FIG. 8 illustrates a configuration example of an inverter 4 with charging capability of a fourth embodiment. The inverter 4 with charging capability of the present embodiment differs from the inverter 1 with charging capability (FIG. 1) in that it includes a plurality of feeding points to which power is supplied from the external power supply 80 and that it includes a switching controller 54.

The inverter 4 with charging capability includes a third diode 33 and a fourth diode 34. The third diode 33 has the cathode electrode connected to a connection point of an arm circuit (phase) different from the connection point to which the first diode 12 is connected. In this example, the cathode electrode of the third diode 33 is connected to the connection point of the V-phase arm circuit.

The fourth diode 34 is connected between the first capacitor 10 and the third diode 33. The anode electrode of the fourth diode 34 is connected to the anode electrode of the third diode 33, and constitutes a feeding point B to which power is supplied from the external power supply 80. The cathode electrode of the fourth diode 34 is connected to the voltage of Vdc/2 at the other end of the first capacitor 10.

The output signal of the rectifier bridge 81 of the external power supply 80 is connected via the rectifier diode 82 to the feeding point B, as to the feeding point A. Accordingly, as with the feeding point A, the voltage of the feeding point B can be stabilized without using a large reactance.

Figure 9:
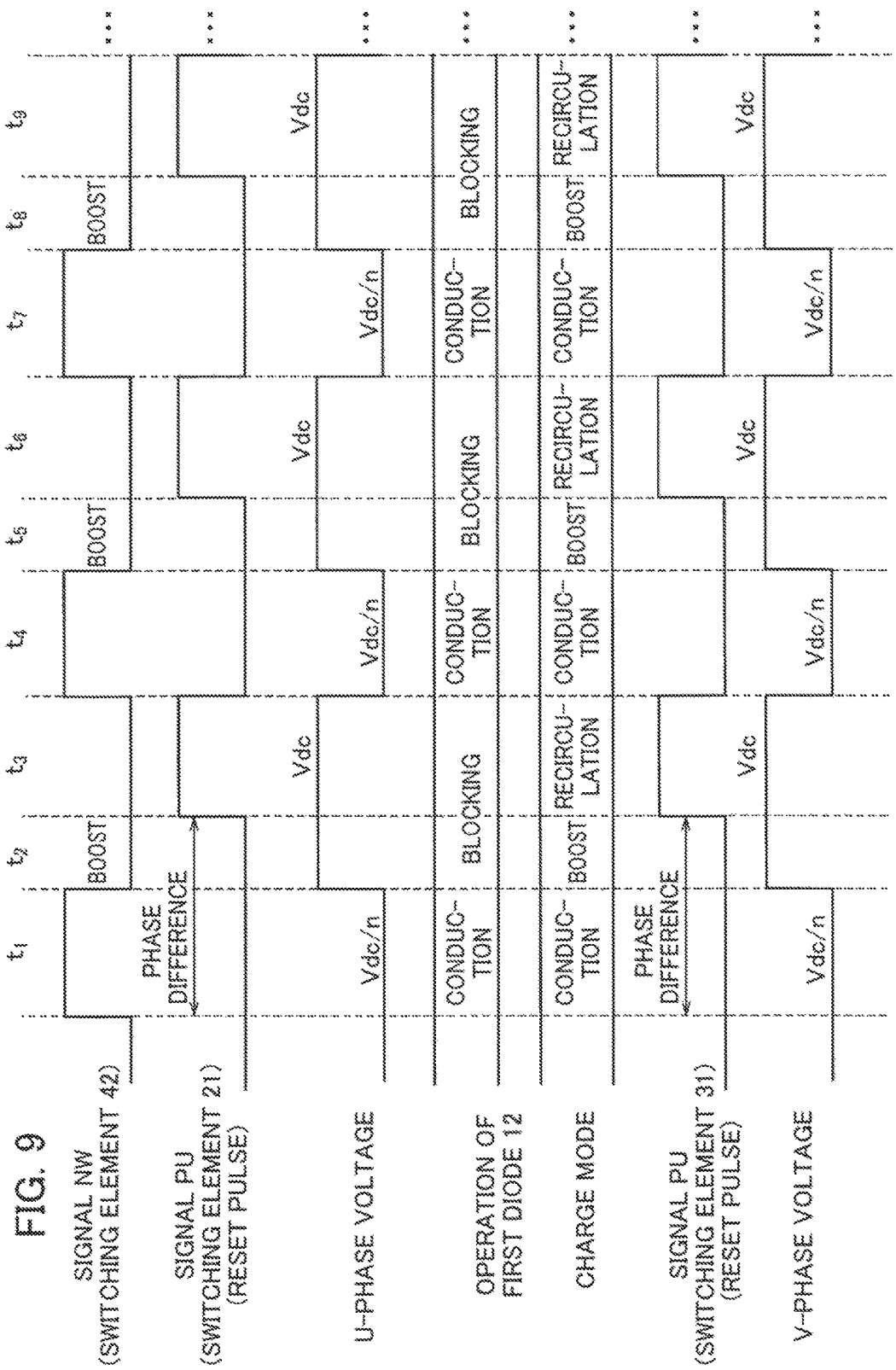
FIG. 9 illustrates an example of the time chart of the switching control performed by a switching controller 54 of the inverter 4 with charging capability.

The charging operation when power is supplied from the external power supply 80 to the feeding points A and B will be explained with reference to FIG. 9. The descriptions of the time chart from the signal NW to the charge mode illustrated in FIG. 9 are the same as the explained FIG. 3. In the inverter 4 with charging capability, the first diode 12 and the third diode 33 operate in the same charge mode.

Turning on/off the W-phase lower arm switching element 42 and the V-phase upper arm switching element 31 allows the power supplied to the feeding point B to charge the battery 70. In this case, the signal PV for turning on/off the V-phase upper arm switching element 31 is the above-described reset pulse.

The path of the current from the feeding point B will be explained. When the output voltage of the rectifier bridge 81 is higher than Vdc/2 in the interval $t_1$, the current will flow through the rectifier diode 82, the third diode 33, the motor coil 60v, the motor coil 60w, and the switching element 42.

As described above, the first diode 12 and third diode 33 of the inverter 4 with charging capability operate in the "conduction mode" in the interval $t_1$, respectively. Because the first diode 12 and the third diode 33 operate in the "conduction mode", the current flowing from the external power supply 80 to the motor 60 increases.

The magnetic energy by the current in this "conduction mode" is stored in the motor coils 60u and 60w and in the motor coils 60v and 60w. This stored magnetic energy will increase by the amount of an increase in the current than in the case of the inverter 1 with charging capability. This magnetic energy generates, in the U-phase voltage and V-phase voltage, a boosted voltage waveform (self-induction electromotive force) corresponding to each energy thereof at the moment when the interval $t_2$ starts. The subsequent operation is the same as that of the inverter 1 with charging capability.

As described above, the inverter 4 with charging capability including a plurality of feeding points can increase the charging power more than the inverter 1 with charging capability having one feeding point. Note that a configuration other than a combination of the feeding points A and B can be also contemplated. Then, a modified example of the inverter 4 with charging capability will be explained.

(Modified Example)

Figure 10:
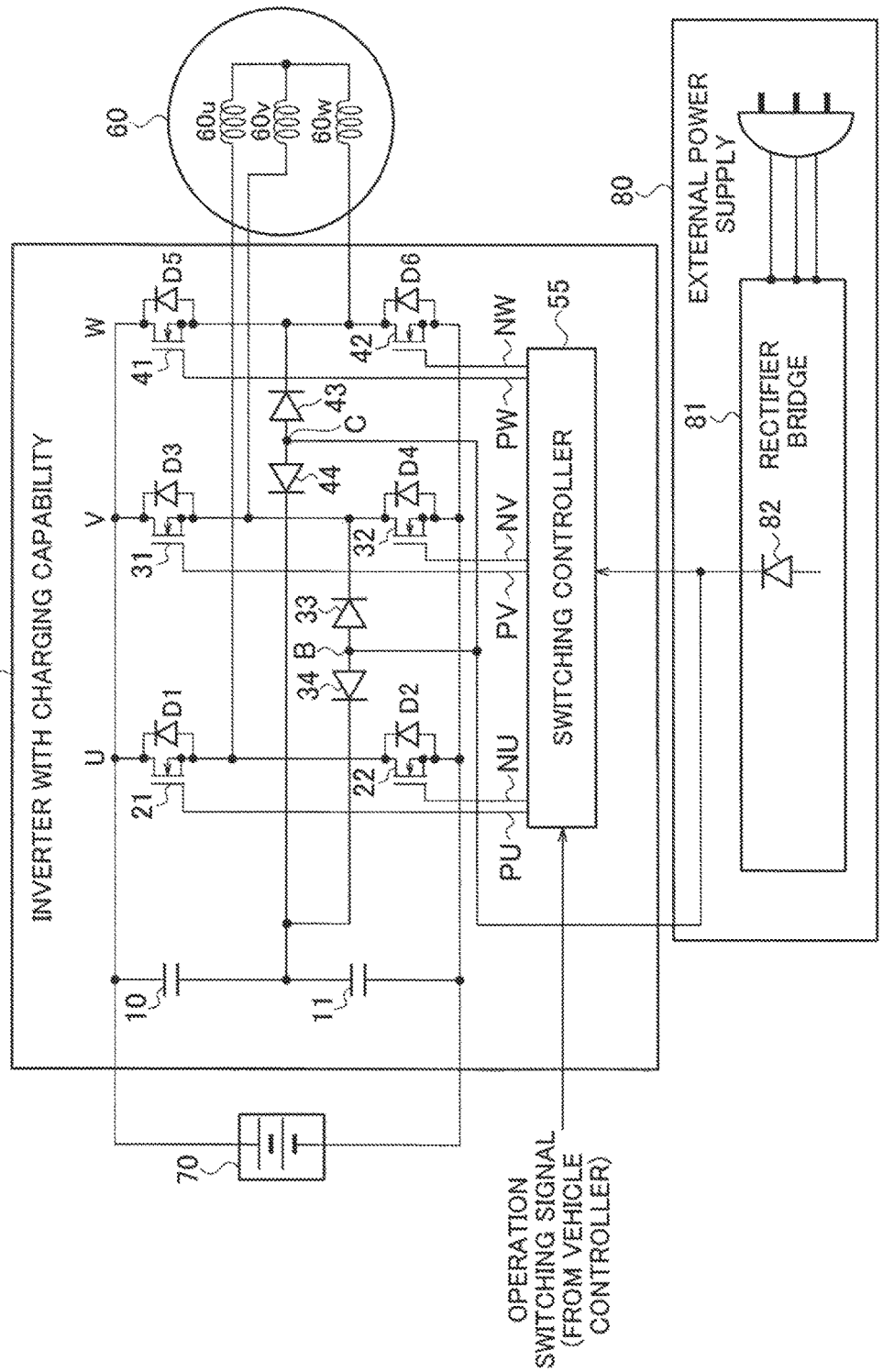
FIG. 10 illustrates a configuration example of an inverter 5 with charging capability of a modification of the inverter 4 with charging capability.

FIG. 10 illustrates a configuration example of an inverter 5 with charging capability of a modification of the inverter 4 with charging capability. The inverter 5 with charging capability of the present embodiment differs in that it includes a feeding point C in place of the feeding point A of the inverter 4 with charging capability. Moreover, the inverter 5 with charging capability of the present embodiment differs from the inverter 4 with charging capability in that it includes a switching controller 55.

The feeding point C is constituted by connecting the anode electrode of a fifth diode 43 having the cathode electrode connected to the connection point of the W-phase arm circuit and the anode electrode of a sixth diode 44 having the cathode electrode connected to the other end of the first capacitor 10. The current supplied to the feeding point C from the external power supply 80 flows through the fifth diode 43, the motor coil 60w, the motor coil 60u, and the U-phase lower arm switching element 22.

The current supplied to the feeding point B from the external power supply 80 flows through the third diode 33, the motor coil 60v, the motor coil 60u, and the U-phase lower arm switching element 22. As described above, the inverter 5 with charging capability differs from the inverter 4 with charging capability in that the lower arm switching element for feeding the current therethrough is the U-phase lower arm switching element 22. In the inverter 4 with charging capability, the W-phase lower arm switching element 42 is turned on/off.

In the inverter 5 with charging capability, the signal input to the gate electrode of the U-phase lower arm switching element 22 is set to be the same as the U signal NW of FIG. 9. Moreover, the signal input to the gate electrode of each of the V-phase upper arm switching element 31 and W-phase upper arm switching element 41 is set to be the same as the signal PU of FIG. 9. The method for controlling to turn on/off the U-phase lower arm switching element 22, the V-phase upper arm switching element 31, and the W-phase upper arm switching element 41, respectively, is the same as in the inverter 4 with charging capability.

The switching controllers 54 and 55 of the inverters 4 and 5 with charging capability each including a plurality of feeding points charge the battery 70 by controlling a phase difference of the on-timing between a lower arm switching element of the arm circuit not to be supplied with power and an upper arm switching element of the arm circuit to be supplied with power. Note that, even a configuration of combining the feeding point A for supplying power to the U-phase arm circuit and the feeding point C for supplying power to the W-phase arm circuit exhibits the similar operational effect. Note that the illustration of a functional configuration example of an inverter with charging capability in which the feeding point A and feeding point C are combined is omitted.

(Fifth Embodiment)

Figure 11:
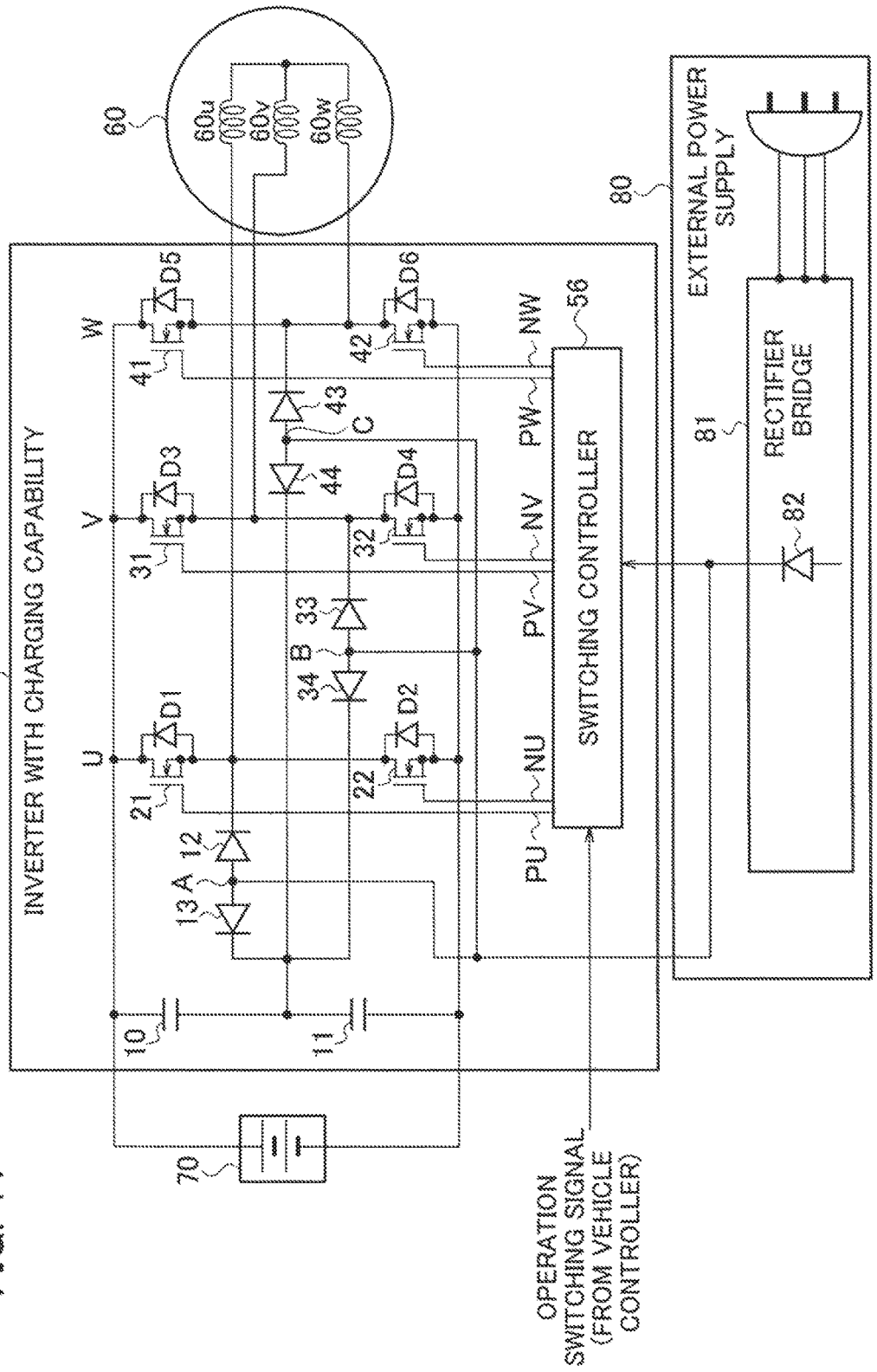
FIG. 11 illustrates a configuration example of an inverter 6 with charging capability of a fifth embodiment.

FIG. 11 illustrates a configuration example of an inverter 6 with charging capability of a fifth embodiment. The inverter 6 with charging capability of the present embodiment differs from the inverter 1 with charging capability (FIG. 1) in that it includes the feeding points A, B, and C via which power is supplied to the U-phase, V-phase, and W-phase from the external power supply 80, respectively, and that it includes a switching controller 56.

The switching controller 56 turns on/off the U-phase lower arm switching element 22 to which the first diode 12 is connected, the V-phase lower arm switching element 32 to which the third diode 33 is connected, and the W-phase lower arm switching element 42 to which the fifth diode 43 is connected. The switching controller 56 turns on/off the switching elements 22, 32, and 42 with an ON time of a time width during which the currents flowing through the respective switching elements 22, 32, and 42 are not shorted.

Here, the time width during which the currents are not shorted is a time width during which a short-circuit current will not flow, even if the switching elements 22, 32, and 42 are turned on, due to the inductance component of a feeder for supplying power to each of the feeding points A, B, and C from the external power supply 80. This inductance component may be a parasitic inductance or may be a finite inductance component. For the finite inductance component, an inductance of a discrete component is inserted and added between each of the feeding points A, B, C and the rectifier diode 82.

Figure 12:
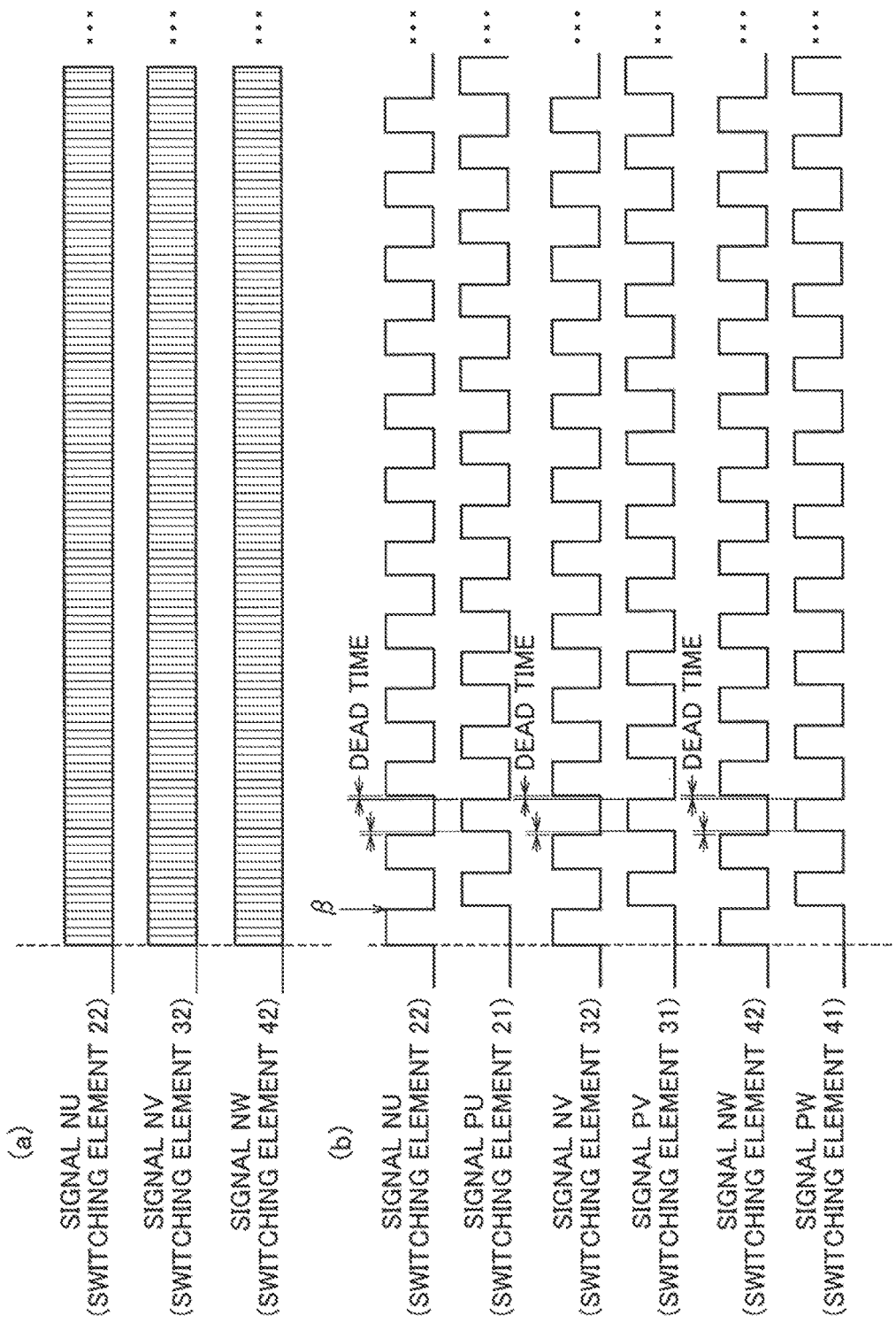

FIG. 12 illustrates the signal NU, signal NV, and signal NW that are the examples of the waveform of the signal which the switching controller 56 outputs to the respective switching elements 22, 32, and 42. FIG. 12(a) illustrates the waveforms in a long horizontal axis (in a long period time). FIG. 12(b) illustrates the waveforms in a short horizontal axis (in a short period time).

From the top of FIG. 12(a), there are illustrated the signal NU input to the gate electrode of the U-phase lower arm switching element 22, the signal NV input to the gate electrode of the V-phase lower arm switching element 32, and the signal NW input to the gate electrode of the W-phase lower arm switching element 42. As described above, the switching controller 56 turns on/off the lower arm switching element of each phase after providing a dead time of a short time width during which the current flowing through each switching element does not result in a short-circuit current. Note that, in FIG. 12, the phases of the respective phases are described as being aligned, but not necessarily limited thereto, and a phase difference may be provided.

At the moment of turning off the lower arm switching element 22, 32, or 42 of each phase, a boosted voltage waveform (self-induction electromotive force) is generated in each phase voltage. This boosted voltage waveform generated in each phase charges the battery 70 via the diode D1, D3 or D5.

Note that, when the lower arm switching element 22, 32, or 42 of each phase is turned off, the upper arm switching element 21, 31, or 41 of each phase may be turned on. The time chart in this case is illustrated in FIG. 12(b).

From the top of FIG. 12(b), there are illustrated the signals NU, PU, the signals NV, PV, and the signals NW, PW. The signals PU, PV, and PW are the signals obtained by inverting the signals NU, NV, and NW, respectively.

At the moment (β) when the signal PU varies from "1" to "0", a boosted voltage waveform (self-induction electromotive force) is generated in the U-phase arm circuit. Because the signal PU varies from "0" to "1" simultaneously with the generation of this boosted voltage waveform, the U-phase upper arm switching element 21 is turned on. As the result, the boosted voltage waveform can charge the battery 70 without causing the loss due to the forward voltage VF of the diode D1. The same is true of the other phases (V-phase, W-phase).

As described above, in the configuration having the feeding points A, B, and C provided in the respective arm circuits of three phases, the lower arm switching elements 22, 32, and 42 of the respective phases are turned on/off with a short time width. Turning on/off the lower arm switching elements 22, 32, and 42 with a short time width allows the battery 70 to be charged even if power is supplied from the external power supply 80 to all of the three phases.

(Sixth Embodiment)

Figure 13:
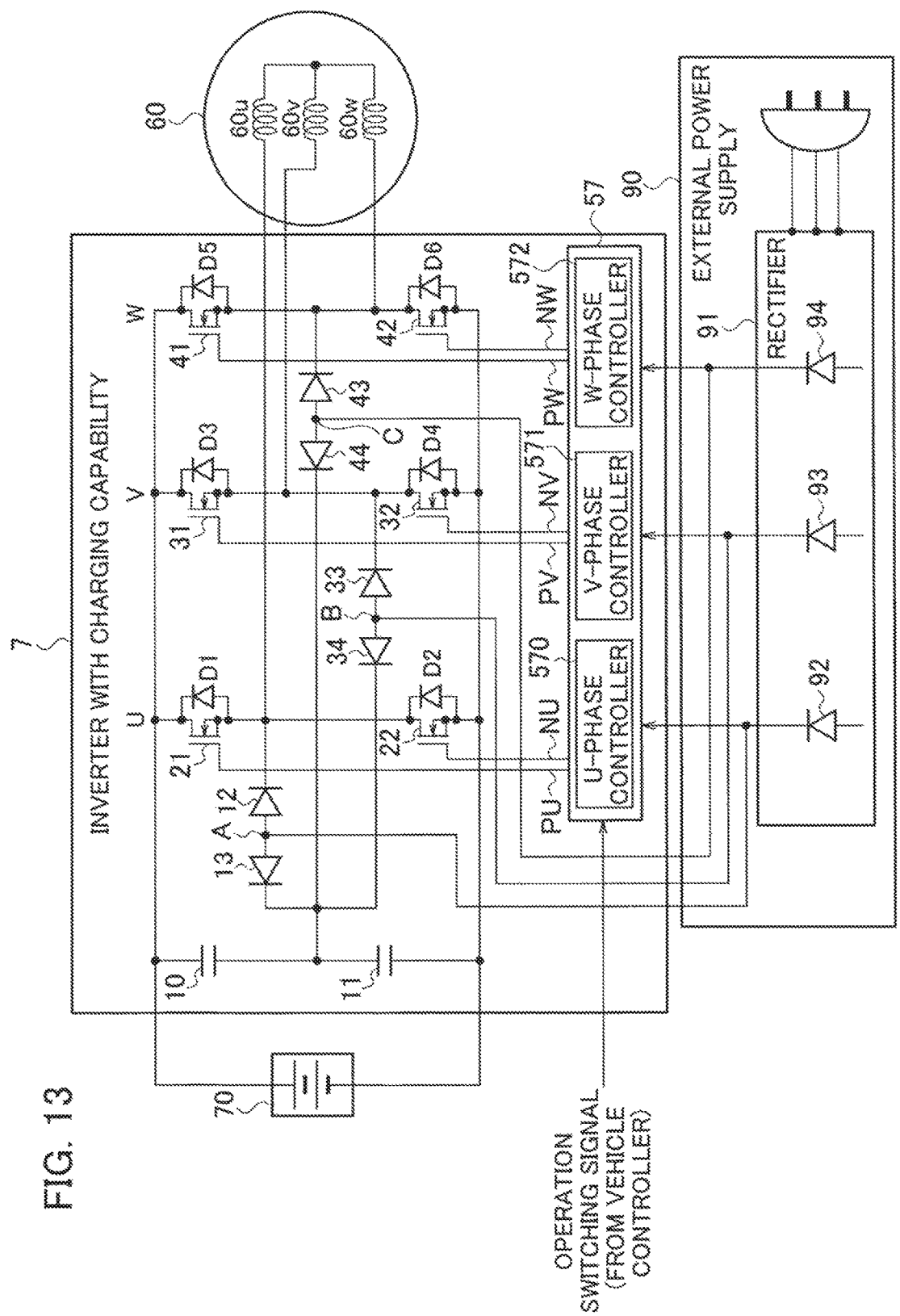
FIG. 13 illustrates a configuration example of an inverter 7 with charging capability of a sixth embodiment.

FIG. 13 illustrates a configuration example of an inverter 7 with charging capability of a sixth embodiment. The inverter 7 with charging capability of the present embodiment differs from the inverter 6 with charging capability (FIG. 11) in that it includes a switching controller 57 and that it includes an external power supply 90 which rectifies, for each phase, and outputs the alternating current of a three-phase AC power supply.

The external power supply 90 includes a rectifier 91. The rectifier 91 outputs the output voltage obtained by rectifying each phase of the three-phase AC power supply. A diode 92 supplies the output voltage obtained by rectifying the alternating current of the U-phase to the feeding point A. A diode 93 supplies the output voltage obtained by rectifying the alternating current of the V-phase to the feeding point B. A diode 94 supplies the output voltage obtained by rectifying the alternating current of the W-phase to the feeding point C.

The output voltage output by the rectifier 91 is output independently for each phase. That is, when the rectification waveform of the U-phase is being output, the output voltages of the V-phase and W-phase are zero. When the rectification waveform of the V-phase is being output, the output voltages of the U-phase and W-phase are zero. When the rectification waveform of the W-phase is being output, the output voltages of the U-phase and V-phase are zero.

The switching controller 57 includes a U-phase controller 570 which turns on/off the switching element of an arm circuit in accordance with the output voltage of the U-phase, a V-phase controller 571 corresponding to the output voltage of the V-phase, and a W-phase controller 572 corresponding to the output voltage of the W-phase. The U-phase controller 570 controls, in the phase during which current can be supplied to the motor 60 from the first diode 12, a phase difference of the on-timing between the U-phase upper arm switching element 21 and, for example, the W-phase lower arm switching element 42. Moreover, the U-phase upper arm and the V-phase lower arm may be turned on/off.

The V-phase controller 571 controls, in the phase during which current can be supplied to the motor 60 from the third diode 33, a phase difference of the on-timing between the V-phase upper arm switching element 31 and, for example, the U-phase lower arm switching element 22. Moreover, the V-phase upper arm and the W-phase lower arm may be turned on/off.

The W-phase controller 572 controls, in the phase during which current can be supplied to the motor 60 from the fifth diode 43, a phase difference of the on-timing between the W-phase upper arm switching element 41 and, for example, the V-phase lower arm switching element 32. Moreover, the W-phase upper arm and the U-phase lower arm may be turned on/off.

As described above, by turning on/off the switching element of each arm circuit in accordance with the phase of the rectification waveform of each phase, it is possible to reduce a power-supply high frequency component generated during charging. As the result, a normal mode noise given to the battery 70 during charging can be reduced.

Moreover, the inverter 7 with charging capability can also control so that the rotor of the motor 60 will not rotate. For example, because a combination of the U-phase controller 570 and V-phase controller 571 can perform the control to cancel a boosted voltage waveform, the rotor may not be mechanically fixed during charging.

(Seventh Embodiment)

Figure 14:
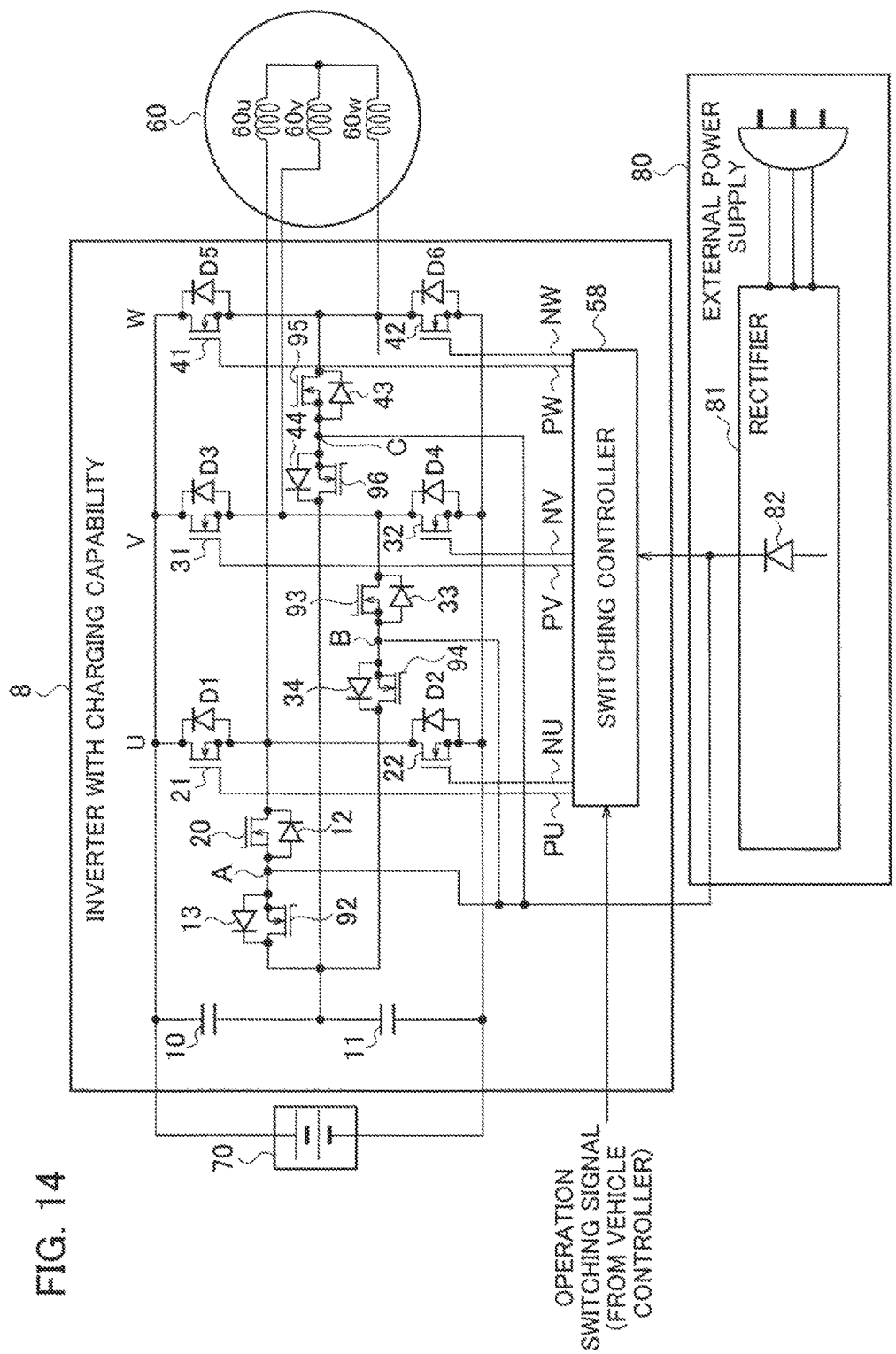
FIG. 14 illustrates a configuration example of an inverter 8 with charging capability of a seventh embodiment.

FIG. 14 illustrates a configuration example of an inverter 8 with charging capability of a seventh embodiment. The inverter 8 with charging capability is an inverter capable of performing the PWM control of three levels. The inverter 8 with charging capability of the present embodiment differs from the inverter 6 with charging capability (FIG. 11) in that it includes a switching element connected in parallel to a diode constituting each of the feeding points A, B, and C.

The first switching element 20 is connected in parallel to the first diode 12. A second switching element 92 is connected in parallel to the second diode 13. A third switching element 93 is connected in parallel to the third diode 33. A fourth switching element 94 is connected in parallel to the fourth diode 34. A fifth switching element 95 is connected in parallel to the fifth diode 43. A sixth switching element 96 is connected in parallel to the sixth diode 44.

By simultaneously conducting (turning on) the first switching element 20 connected in parallel to the first diode 12 and the second switching element 92 connected in parallel to the second diode 13, it is possible to supply the voltage of Vdc/2 which is the voltage between both ends of the second capacitor 11 to the U-phase of the inverter 8 with charging capability. The same is true of the other phases.

The potential of Vdc/2 can be supplied to the V-phase by simultaneously conducting the third switching element 93 and fourth switching element 94. Moreover, in order to supply the potential of Vdc/2 to the W-phase, the fifth switching element 95 and the sixth switching element 96 may be simultaneously conducted.

As described above, according to the inverter 8 with charging capability, in addition to two voltages, i.e., the voltage (Vdc) of the positive electrode and the voltage of the negative electrode of the battery 70, Vdc/2 which is the third voltage can be supplied to the AC side of the inverter. Accordingly, the inverter 8 with charging capability enables the PWM control of three levels.

The on/off control of the first switching element 20, second switching element 92, ..., and the sixth switching element 96 is performed by a load control logic unit (corresponding to the load control logic unit 51 illustrated in FIG. 2) inside a switching controller 58. For the control method, the conventional method for a three-level inverter can be used.

Because the inverter 8 with charging capability generates an AC waveform using the DC voltages of three levels, a smoother AC waveform can be generated. As the result, the vibration of the motor 60 is reduced and noise is also reduced. Moreover, the inverter 8 with charging capability exhibits also the operational effect of dispensing with a large reactance intended to stabilize the potential of a feeding point, as with the inverter 6 with charging capability (FIG. 11).

As described above, according to the embodiments, the following operational effects are obtained.

According to the inverter 1 with charging capability (FIG. 1) of the first embodiment, the potential at the feeding point A can be stabilized without using the conventionally-used large reactance. Accordingly, the inverter with charging capability can be reduced in size.

According to the inverter 2 with charging capability (FIG. 4) of the second embodiment, by turning on the first switching element 20 when the charge mode is the "conduction mode", it is possible to eliminate the voltage drop corresponding to the forward voltage VF of the first diode 12 from the path of the charging current to improve the charging efficiency.

According to the inverter 3 with charging capability (FIG. 7) of the third embodiment, the first diode 12 and the first switching element 20 can be configured as one device 30 (NMOSFET). Accordingly, the inverter 3 with charging capability exhibits an effect of achieving a further reduction in size as compared with the inverter 2 with charging capability.

According to the inverters 4 and 5 with charging capability (FIG. 8 and FIG. 10) of the fourth embodiment, the charging power charged from the external power supply 80 to the battery 70 can be increased more than any of the inverters 1 to 3 with charging capability each having one feeding point because the inverters 4 and 5 with charging capability each include a plurality of feeding points. Note that the inverter 4 with charging capability may be combined with the second embodiment or third embodiment.

According to the inverter 6 with charging capability (FIG. 11) of the fifth embodiment, power is supplied from the external power supply 80 to all of the plurality of phases and the lower arm switching elements 22, 32, and 42 of the respective phases are turned on/off with a short time width. By turning on/off with a short time width, the currents flowing through the switching elements 22, 32, and 42 do not result in a short-circuit current even if power is supplied from the external power supply 80 to all of the three phases, and the battery 70 can be charged.

According to the inverter 7 with charging capability (FIG. 13) of the sixth embodiment, the switching controller 57 includes the U-phase controller 570, V-phase controller 571, and W-phase controller 572 which turn on/off the switching element of an arm circuit in accordance with the output voltage of each phase of the AC power supply. Because the U-phase controller 570, the V-phase controller 571, and the W-phase controller 572 each independently turn on/off a switching element, the power-supply high frequency component generated during charging can be reduced and the normal mode noise given to the battery 70 can be reduced.

According to the inverter 8 with charging capability (FIG. 14) of the seventh embodiment, PWM control of three levels is enabled in addition to the operational effect of dispensing with a large reactance exhibited by the above-described embodiments. The PWM control of three levels can reduce the vibration of the motor 60 and also reduce noise.

In the foregoing, the contents of the present invention have been explained in accordance with the examples, but it is obvious to those skilled in the art that the present invention is not limited to these descriptions and various modifications and improvements are possible.

For example, as a modified example of the inverter 4 with charging capability of the fourth embodiment, the inverter 5 with charging capability implemented only in the V-phase and W-phase has been explained, but power may be supplied to the U-phase and W-phase. Moreover, although an example of Vdc/2 has been illustrated as a specific example of Vdc/n, n may be an integer equal to or greater than 2.

Moreover, the diodes D1 to D6 connected in antiparallel to the NMOSFETs of the upper arm switching elements 21, 31, and 41 and lower arm switching elements 22, 32, and 42 may be the above-described parasitic diodes. Moreover, the same is true of the first diode 12 to the sixth diode 44.

The examples of the present invention explained above can be widely applied to an inverter with charging capability which performs both the load control and the charge control.

REFERENCE SIGNS LIST 1, 2, 3, 4, 5, 6, 7, 8 inverter with charging capability
10 first capacitor
11 second capacitor
12 first diode
13 second diode
20 first switching element
21 U-phase upper arm switching element
22 U-phase lower arm switching element
30 device
31 V-phase upper arm switching element
32 V-phase lower arm switching element
33 third diode
34 fourth diode
41 W-phase upper arm switching element
42 W-phase lower arm switching element
43 fifth diode
44 sixth diode 50, 54, 55, 57, 58 switching controller
60 motor
70 battery
80, 90 external power supply

The invention claimed is:

1. An inverter with charging capability, comprising:
an arm circuit in which
an upper arm switching element to which a positive electrode of a battery is connected and
a lower arm switching element to which a negative electrode of the battery is connected
are connected;
a first capacitor having one end connected to the positive electrode;
a second capacitor connected between the other end of the first capacitor and the negative electrode;
a first diode having a cathode electrode connected to a connection point between the upper arm and lower arm switching elements; and
a second diode having a cathode electrode connected to the other end of the first capacitor,
wherein an anode electrode of the first diode and an anode electrode of the second diode are directly connected at a feeding point, and power is directly supplied from an external power supply to the feeding point.

2. The inverter with charging capability according to claim 1, comprising a first switching element connected in parallel to the first diode.

3. The inverter with charging capability according to claim 2, wherein the first diode and the first switching element are configured by one device.

4. The inverter with charging capability according to claim 2, comprising:
a plurality of the arm circuits; and
a switching controller which turns on/off an upper arm switching element of an arm circuit to which the first diode is connected and a lower arm switching element of an arm circuit different from the arm circuit with a predetermined cycle, respectively,
wherein the switching controller charges the battery by controlling a phase difference of an on-timing between the upper arm switching element and the lower arm switching element.

5. The inverter with charging capability according to claim 4,
wherein the switching controller also turns on/off the first switching element, and
wherein an ON time of the lower arm switching element is set to be longer than an ON time of the first switching element.

6. The inverter with charging capability according to claim 1, comprising:
a plurality of the arm circuits;
a third diode having a cathode electrode connected to a connection point of an arm circuit different from a phase to which the first diode is connected; and
a fourth diode having a cathode electrode connected to the other end of the first capacitor, wherein
power is supplied from an external power supply to an anode electrode of the third diode and to an anode electrode of the fourth diode.

7. The inverter with charging capability according to claim 6, comprising:
a fifth diode having a cathode electrode connected to a connection point of an arm circuit different from a phase to which the first diode and the third diode are connected; and
a sixth diode having a cathode electrode connected to the other end of the first capacitor,
wherein power is supplied from an external power supply to an anode electrode of the fifth diode and to an anode electrode of the sixth diode.

8. The inverter with charging capability according to claim 7, comprising a switching controller which turns on/off a switching element provided in a lower arm of each arm circuit,
wherein the switching controller turns on/off the switching element with an ON time of a time width during which currents flowing through the respective switching elements are not shorted.

9. The inverter with charging capability according to claim 7,
wherein power of a different phase is supplied to each of the anode electrode of the first diode, the anode electrode of the third diode, and the anode electrode of the fifth diode, and
wherein the inverter with charging capability comprises a switching controller which turns on/off a switching element of the arm circuit in accordance with the phase.

10. The inverter with charging capability according to claim 7, comprising;
a first switching element connected in parallel to the first diode;
a second switching element connected in parallel to the second diode;
a third switching element connected in parallel to the third diode;
a fourth switching element connected in parallel to the fourth diode,
a fifth switching element connected in parallel to the fifth diode; and
a sixth switching element connected in parallel to the sixth diode.

* * * * *